(12) United States Patent
Kawaguchi et al.

(10) Patent No.: US 8,566,550 B2
(45) Date of Patent: Oct. 22, 2013

(54) APPLICATION AND TIER CONFIGURATION MANAGEMENT IN DYNAMIC PAGE REALLOCATION STORAGE SYSTEM

(75) Inventors: Tomohiro Kawaguchi, Cupertino, CA (US); Toshio Otani, Sunnyvale, CA (US); Atsushi Murase, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 651 days.

(21) Appl. No.: 12/564,340

(22) Filed: Sep. 22, 2009

(65) Prior Publication Data

US 2011/0072225 A1    Mar. 24, 2011

(51) Int. Cl.
*G06F 12/00* (2006.01)
(52) U.S. Cl.
USPC ........... 711/170; 711/100; 711/114; 711/154; 711/12.001
(58) Field of Classification Search
USPC .......... 711/100, 114, 154, 162, 170, E12.001, 711/E12.002
See application file for complete search history.

(56) References Cited

U.S. PATENT DOCUMENTS

| | | |
|---|---|---|
| 7,330,950 B2 | 2/2008 | Matsunami et al. |
| 2006/0047909 A1 | 3/2006 | Takahashi et al. |
| 2007/0055713 A1 | 3/2007 | Nagai et al. |
| 2007/0192560 A1 | 8/2007 | Furuhashi |
| 2007/0233987 A1* | 10/2007 | Maruyama et al. ........... 711/165 |
| 2007/0239803 A1 | 10/2007 | Mimatsu |
| 2007/0239806 A1 | 10/2007 | Glover |
| 2008/0104081 A1 | 5/2008 | Mimatsu |
| 2008/0184000 A1 | 7/2008 | Kawaguchi |

\* cited by examiner

*Primary Examiner* — Jasmine Song
(74) *Attorney, Agent, or Firm* — Mattingly & Malur, PC

(57) ABSTRACT

For storage management in a tiered storage environment in a system having one or more applications running on a host computer which is connected to a storage system, the storage system comprises storage volumes in a pool which are divided into a plurality of tiers having different tier levels, the tiers being organized according to a tier configuration rule; and a controller. The controller allocates the pool to a plurality of virtual volumes based on a change of the tier levels against the physical storage devices. The controller stores a relation between data in the storage system being accessed by each application running on the host computer and an application ID of the application accessing the data. The tier level of a portion of a storage volume of the plurality of storage volumes is changed based at least in part on the application accessing data in the storage volume.

20 Claims, 40 Drawing Sheets

112-11-3

| Disk# (112-11-3-1) | RAID Gr.# (112-11-3-2) | Model (112-11-3-3) |
|---|---|---|
| 0 | 0 | 1234-5678 |
| 1 | 0 | 1234-5678 |
| 2 | 0 | 1234-5678 |
| 3 | 0 | 1234-5678 |
| 4 | 1 | AB-CDEF-GHI-1 |
| 5 | 1 | AB-CDEF-GHI-1 |
| 6 | 1 | AB-CDEF-GHI-1 |
| 7 | 1 | AB-CDEF-GHI-1 |

Disk Management Table

FIG. 3

| | 112-11-4-1 | 112-11-4-2 | 112-11-4-3 | 112-11-4-4 | 112-11-4-5 | 112-11-4-6 | 112-11-4-7 |
|---|---|---|---|---|---|---|---|
| 112-11-4 | Model | Disk Type | RPM | Cell Type | Interface | Platter Capacity | Physical Capacity |
| | 1234-5678 | Flash SSD | - | SLC | SAS | - | 150[GB] |
| | 1234-5679 | Flash SSD | - | MLC | SATA | - | 300[GB] |
| | Alpha-111-222 | Flash SSD | - | SLC | SAS | - | 300[GB] |
| | Beta-111-222 | Flash SSD | - | MLC | SAS | - | 300[GB] |
| | ABC-DEF-GHI-1 | HDD | 7200 | - | SATA | 250[GB] | 1000[GB] |
| | ABC-DEF-GHI-2 | HDD | 10000 | - | SAS | 150[GB] | 300[GB] |
| | ABC-DEF-GHI-3 | HDD | 15000 | - | SAS | 150[GB] | 300[GB] |
| | ZZZ-XXX-YYY | HDD | 15000 | - | SAS | 150[GB] | 300[GB] |

Disk Information Table

*FIG. 4*

| RAID Gr. # | RAID Lv. | Disk# | Capacity | Tier# | Access Counter | Free Chunk Queue Index | Used Chunk Queue Index |
|---|---|---|---|---|---|---|---|
| 0 | 5 | 0-3 | 900[GB] | 0 | 3465 | 1 | 8 |
| 1 | 5 | 4-7 | 3000[GB] | 2 | 7634 | 7 | 15 |
| 2 | 5 | 8-11 | 3000[GB] | 2 | 1788 | 2 | 3 |
| 3 | NULL | NULL | 0[GB] | NULL | NULL | NULL | NULL |
| 4 | NULL | NULL | 0[GB] | NULL | NULL | NULL | NULL |
| 5 | NULL | NULL | 0[GB] | 1 | NULL | NULL | NULL |
| 6 | 10 | 64-67 | 1500[GB] | 1 | 2828 | 31 | 22 |
| 7 | 10 | 68-72 | 1500[GB] | 1 | 902 | 14 | 8 |

RAID Group Management Table

FIG. 5

| Vol# | Capacity | RAID Gr. # | Chunk# |
|---|---|---|---|
| 0 | 10[GB] | 1 | 23 |
| 1 | 30[GB] | 0 | 11 |
| 2 | 20[GB] | 1 | 71 |
| 3 | 60[GB] | 7 | 3 |
| 4 | N/A | N/A | N/A |
| 5 | 60[GB] | 2 | 1 |
| 6 | N/A | N/A | N/A |
| 7 | N/A | N/A | N/A |

Virtual Volume Management Table

FIG. 6

| Tier # | Total Capacity | Used Capacity | RAID Gr. # | Configuration Rule |
|---|---|---|---|---|
| 0 | 10000[GB] | 8000[GB] | 0, 1, 8 | Flash/SSD, SAS, and SLC (reserve 20%) |
| 1 | 30000[GB] | 23000[GB] | 2, 11, 13 | HDD, SAS and 10Krpm and max 12 disks |
| 2 | 80000[GB] | 200[GB] | 16, 18 | HDD, SAS and 10Krpm or 15Krpm |
| 3 | 80000[GB] | 200[GB] | 7, 19, 20, 22 | HDD, SATA, 7200rpm and min 12 disks |
| 4 | 60000[GB] | 500[GB] | 9, 10, 12, 14, 15 | HDD, SATA, 7200rpm and max 20 disks |
| 5 | 2000[GB] | 0[GB] | 17, 21 | Other than listed above |
| 6 | NULL | NULL | NULL | NULL |
| 7 | NULL | NULL | NULL | NULL |

Tier Management Table

FIG. 7

| Top LBA Addr. of Virtual Vol. Page | RAID Gr. # | Top LBA Addr. of Capacity Pool Page | I/O Counter | Counter Cleared Time | Page Owner Application ID |
|---|---|---|---|---|---|
| 0x0000 | 10 | 0x4000 | 53 | May 1, 2011 | IP/ 192.168.0.1 |
| 0x0100 | 14 | 0x0200 | 699 | May 1, 2011 | IP/ 192.168.0.1 |
| 0x0200 | 18 | 0x0000 | 0 | May 1, 2011 | IP/ 192.168.0.1 |
| 0x0300 | N/A | N/A | N/A | | N/A |
| 0x0400 | 10 | 0x3200 | 72 | May 1, 2011 | WWPN/ 12:34:56:78:9A :BC:DE:F0 |
| 0x0500 | 18 | 0x0200 | 3 | May 1, 2011 | WWPN/ 12:34:56:78:9A :BC:DE:F0 |
| 0x0600 | 10 | 0x1000 | 93 | May 1, 2011 | WWPN/ 12:34:56:78:9A :BC:DE:F0 |

Virtual Volume Page Management Table
112-11-6

| Capacity Pool Chunk# | Virtual Volume# | Used Capacity | Deleted Capacity | Prev. Chunk Pointer | Next Chunk Pointer |
|---|---|---|---|---|---|
| 0 | 2 | 0 | 0kB | 7 | 2 |
| 1 | 10 | 2048kB | 1024kB | 2 | 3 |
| 2 | 5 | 8192kB | 768kB | 0 | 1 |
| 3 | 7 | 4096kB | 0kB | 1 | Null |
| 4 | N/A | 0 | 0 | 21 | 31 |

Capacity Pool Chunk Management Table

FIG. 10

Capacity Pool Page Management Table (112-11-8)

| Capacity Pool Page Index (112-11-8-1) | Virtual Volume Page# (112-11-8-2) |
|---|---|
| 0 | 10 |
| 1 | 27 |
| 2 | NULL |
| 3 | 13 |

| Application ID | Tier# |
|---|---|
| IP/ 192.168.0.1 | 2 |
| IP/ 192.168.0.2 | 3 |
| WWPN/ 12:34:56:78:9A:BC:DE:F0 | 1 |
| WWPN/ 12:34:56:78:9A:BC:DE:F1 | 3 |
| Default | 2 |

Application Tier Management Table

FIG. 11

| | 112-14-1 | 112-14-2 | 112-14-3 | 112-14-4 | 112-14-7 | 112-14-8 |
|---|---|---|---|---|---|---|
| | Cache Slot# | Volume# | LBA | Next | I/O Counter | Application ID |
| | 0 | 2 | 0xA00 | 1 | 34 | N/A |
| | 1 | 1 | 0x7E000 | 2 | 163 | N/A |
| | 2 | 1 | 0x9700 | 3 | 812 | N/A |
| | 3 | 0 | 0x0000 | NULL | 55 | N/A |
| | 4 | 2 | 0xC500 | 5 | 734 | IP/ 192.168.0.1 |
| | 5 | 1 | 0x1100 | 6 | 23 | IP/ 192.168.0.1 |
| | 6 | 1 | 0xFF00 | NULL | 45 | IP/ 192.168.0.1 |

| 112-14-5 | 112-14-6 |
|---|---|
| Kind of Queue | Pointer |
| Free | 2 |
| Clean | 1 |
| Dirty | 4 |

Cache Management Table 112-14

FIG. 12

(Adapted from: RFC791, RFC793, RFC790, RFC3720 and SBC-3 Draft)

| | 112-19-1-1 | 112-19-1-2 | 112-19-1-3 | 112-19-1-4 |
|---|---|---|---|---|
| | Vol# | Pair Status | Vol Attribution | Remote Vol WWPN / LUN |
| | 0 | PAIR | M-Vol | 98:76:54:32:10:98:7 6:54 / 10 |
| | 1 | SMPL | N/A | N/A |
| | 2 | PAIR | M-Vol | 98:76:54:32:10:98:7 6:54 / 13 |
| | 3 | PAIR | R-Vol | 98:76:54:32:10:98:7 6:53 / 56 |
| | 4 | N/A | N/A | N/A |
| | 5 | SMPL | N/A | N/A |
| | 6 | N/A | N/A | N/A |
| | 7 | N/A | N/A | N/A |

Remote Copy Pair Management Table 112-19-1

FIG. 36

APPLICATION AND TIER CONFIGURATION MANAGEMENT IN DYNAMIC PAGE REALLOCATION STORAGE SYSTEM

BACKGROUND OF THE INVENTION

The present invention relates generally to management and configuration of tiered storage systems and, more particularly, to methods and apparatus for application and tier configuration management in a dynamic page reallocation storage system in a remote copy environment.

Storage system can use several types of disks including, for example, SSD (Solid State Disk), SAS (Serial Attached) HDD, and SATA (Serial ATA) HDD. These disks are different in performance, capacity, reliability, and cost. When the storage user acquires a storage volume, he chooses from the various types of disks pursuant to the purpose and requirement to maximize the ROI (return on investment). The purpose and requirement may vary with time. In that case, there will be a need to tune the disk configuration for optimization. One approach is to use tiered storage management to maintain a high ROI. Additionally, there may be a need to tune the tiered storage configuration dynamically to keep a maximized ROI.

There are existing technologies for managing a tiered storage environment. For example, US20070055713A1 discloses a volume capacity provisioning method, according to which a storage system selects suitable disks depending on that use and the required performance when a volume requires expanding capacity. US20080184000A1 discloses a thin provisioning (sliced by pages) volume migration method between a plurality of tiers in one pool. A storage system selects a low access volume and seamlessly migrates it to a low ratency tier in another storage module. US20070192560A1 discloses a disk installation controlling method for thin provisioning pool, according to which a storage system installs disks to a suitable pool depending on the system configurations. US20070055713A1 and US20070192560A1 are useful for the tuning of volume tier configuration. US20080184000A1 is useful for capacity installation for a tier. These disclosures are incorporated herein by reference. See also RFC 791 for INTERNET PROTOCOL, RFC 793 for TRANSMISSION CONTROL PROTOCOL, RFC 790 for ASSIGNED NUMBERS, RFC 3720 for Internet Small Computer Systems Interface (iSCSI), SBC-3 Draft for Draft of SCSI Block Commands (http://www.t10.org), FC-FS-2 Draft for Draft of FIBRE CHANNEL FRAMING AND SIGNALING-2 (http://www.t11.org), and FC-BB-5 Draft for Draft of FIBRE CHANNEL BACKBONE-5 (http://www.t11.org).

BRIEF SUMMARY OF THE INVENTION

Embodiments of the invention provide methods and apparatus for application and tier configuration management in a dynamic page reallocation storage system in a remote copy environment. To replace the tier of certain data requires knowledge of the priority, activity, and performance requirement of an application that has the data, since the replacement operation may cause unwanted performance and a decrease in reliability. It is difficult for a storage to judge whether certain data should be replaced to another tier or not because the storage that has the data does not know which application accesses the data. This invention provides a technique whereby the application on a server publishes I/O involving the application ID. The storage stores the relation between the accessed data and the application ID when the application accesses the data. The storage replaces the tier of the data in conjunction with the application status of the application. This provides the application and tier configuration management in a dynamic page reallocation storage system.

An aspect of the present invention is directed to a storage system for storage management in a tiered storage environment in a system having one or more applications running on a host computer which is connected to the storage system. The storage system comprises a plurality of storage volumes in a pool which are divided into a plurality of tiers having different tier levels, the tiers being organized according to a tier configuration rule, the plurality of storage volumes provided by a plurality of physical storage devices in the storage system; and a controller controlling the plurality of physical storage devices, the controller including a processor and a memory. The controller allocates the pool to a plurality of virtual volumes based on a change of the tier levels against the physical storage devices. The controller stores a relation between data in the storage system being accessed by each application running on the host computer and an application ID of the application accessing the data. The tier level of a portion of a storage volume of the plurality of storage volumes is changed based at least in part on the application accessing data in the storage volume.

In some embodiments, the controller stores a relation between data in a storage volume in the storage system being accessed by each application running on the host computer and an application ID of the application which publishes write I/O to the storage volume containing the data accessed by the application. The tier level of the portion of the storage volume is changed based at least in part on an application status of the application accessing data in the storage volume, the application status including at least one of priority, activity, or performance requirement of the application. The controller dynamically allocates the pool to the plurality of virtual volumes based on the change of tier levels against the physical storage devices, and dynamically stores the relation between the data in the storage system being accessed by each application running on the host computer and the application ID of the application accessing the data. The controller allocates the pool to the plurality of virtual volumes based on a change of tier levels against the physical storage devices in response to an input from a management terminal. At least one virtual volume of the plurality of virtual volumes has one or more designated areas that are capable of setting the tier level therein in accordance with changing tier configurations by the controller. The application ID is selected from the group consisting of an IP address set to the application in an iSCSI frame, a Fibre Channel ID of the application in a Fibre Channel frame, and a Fibre Channel ID of the application in a Fibre Channel over Ethernet frame.

In specific embodiments, the storage system is connected to a remote storage system. At least one of the storage volumes in the storage system is in remote copy paired status with a remote storage volume in the remote storage system and is one of a replication source volume or a replication target volume. For a replication source volume, the controller transfers tier information of the replication source volume to the remote storage volume as a replication target volume in paired status with the replication source volume. For a replication target volume, the controller receives tier information of the replication target volume from the remote storage volume as a replication source volume in paired status with the replication target volume.

Another aspect of the invention is directed to a system including a storage system connected to a host computer which has one or more applications running thereon and a remote storage system connected to a remote host computer which has one or more applications running thereon, the storage system and the remote storage system for storage management in a tiered storage environment and being connected to one another. The storage system comprises a plurality of storage volumes in a pool which are divided into a plurality of tiers having different tier levels, the tiers being organized according to a tier configuration rule, the plurality of storage volumes provided by a plurality of physical storage devices in the storage system; and a controller controlling the plurality of physical storage devices, the controller including a processor and a memory. The controller allocates the pool to a plurality of virtual volumes based on a change of the tier levels against the physical storage devices. The controller stores a relation between data in the storage system being accessed by each application running on the host computer and an application ID of the application accessing the data. The tier level of a portion of a storage volume of the plurality of storage volumes is changed based at least in part on the application accessing data in the storage volume.

Another aspect of the invention is directed to a system including a storage system connected to a host computer and a remote storage system connected to a remote host computer, the storage system and the remote storage system for storage management in a tiered storage environment and being connected to one another. The storage system comprises a plurality of storage volumes in a pool which are divided into a plurality of tiers having different tier levels, the tiers being organized according to a tier configuration rule, the plurality of storage volumes provided by a plurality of physical storage devices in the storage system; and a controller controlling the plurality of physical storage devices, the controller including a processor and a memory. The controller allocates the pool to a plurality of virtual volumes based on a change of the tier levels against the physical storage devices. The tier level of a virtual volume page of the plurality of virtual volumes is changed based on a change in the tier configuration rule. When a tier level of the virtual volume page is changed for a volume having remote copy pair, the controller sends information of the tier level of the virtual volume page to the remote storage system so that tier level of corresponding virtual volume page is changed in the remote storage system.

In some embodiments, the tier level of a storage volume of the plurality of storage volumes is changed based at least in part on an application status of application accessing data in the storage volume, the application status including at least one of priority, activity, or performance requirement of the application. At least one of the storage volumes in the storage system is in remote copy paired status with a remote storage volume in the remote storage system, and when a tier level of the virtual volume page is changed the remote copy paired status is checked to determine whether the virtual volume is paired or not. The tier level of the corresponding virtual volume page is changed by migrating the virtual volume page to another virtual volume page meeting the tier level configuration. After the migration mapping information between the virtual volume page and the pool is updated.

These and other features and advantages of the present invention will become apparent to those of ordinary skill in the art in view of the following detailed description of the specific embodiments.

BRIEF DESCRIPTION OF THE DRAWINGS

FIG. 3 illustrates an example of a Disk Management Table.

FIG. 4 illustrates an example of a Disk Information Table.

FIG. 5 illustrates an example of a RAID Group Management Table.

FIG. 6 illustrates an example of a Virtual Volume Management Table.

FIG. 7 illustrates an example of a Tier Management Table.

FIG. 8 illustrates an example of a Virtual Volume Page Management Table.

FIG. 9 illustrates an example of a Capacity Pool Chunk Management Table.

FIG. 10 illustrates an example of a Capacity Pool Page Management Table.

FIG. 11 illustrates an example of an Application Tier Management Table.

FIG. 12 illustrates an example of a Cache Management Table.

FIG. 36 illustrates an example of a Remote Copy Pair Management Table.

DETAILED DESCRIPTION OF THE INVENTION

Figure 1:
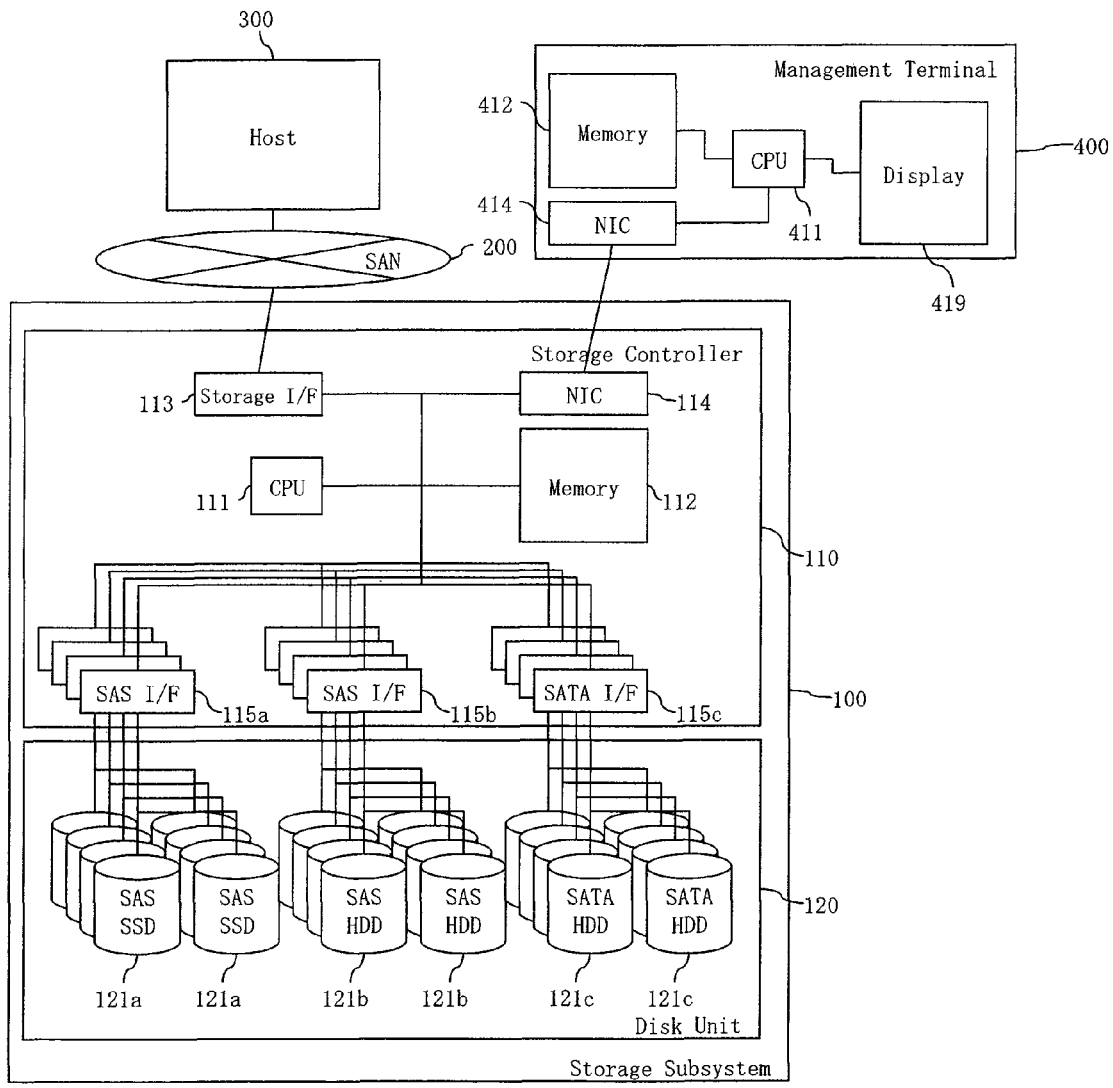
FIG. 1 illustrates the hardware configuration of a system in which the method and apparatus of the invention may be applied according to a first embodiment of the invention.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Exemplary embodiments of the invention, as will be described in greater detail below, provide apparatuses, methods and computer programs for application and tier configuration management in a dynamic page reallocation storage system in a remote copy environment.

First Embodiment

1. System Configuration

FIG. 1 illustrates the hardware configuration of a system in which the method and apparatus of the invention may be applied according to a first embodiment of the invention. A storage subsystem 100 for storing data is connected to a host computer 300 by a storage network. A storage management terminal 400 is connected to the storage subsystem 100.

The storage subsystem 100 includes a storage controller 110 that has a CPU 111, a memory 112, a storage interface 113, a local network interface 114, and disk interfaces 115 which may include SAS I/F and SATA I/F. The CPU 111 controls the storage subsystem 100, and reads programs and tables stored in the memory 112. The storage interface 113 connects with the host computer 300 via the storage network 200. The local network interface 114 connects with the storage management terminal 400. The disk interfaces 115 (115a, 115b, etc.) connect with disks 121. A disk unit 120 includes a plurality of disks 121 (121a, 121b, etc) for storing data, which may include SAS SSD (flash memory), SAS HDD, and SATA HDD.

The host computer 300 sends I/O requests to the storage subsystem 100 via the storage network 200, and sends and receives data from the storage subsystem 100 via the storage network 200.

The storage management terminal 400 provides availability/reliability information of the storage subsystem 100. The terminal 400 includes a CPU 411 which reads programs and tables stored in the memory 412. A local network interface 414 connects with the storage subsystem 100. A display 419 shows availability/reliability information of the storage subsystem 100.

Figure 2:
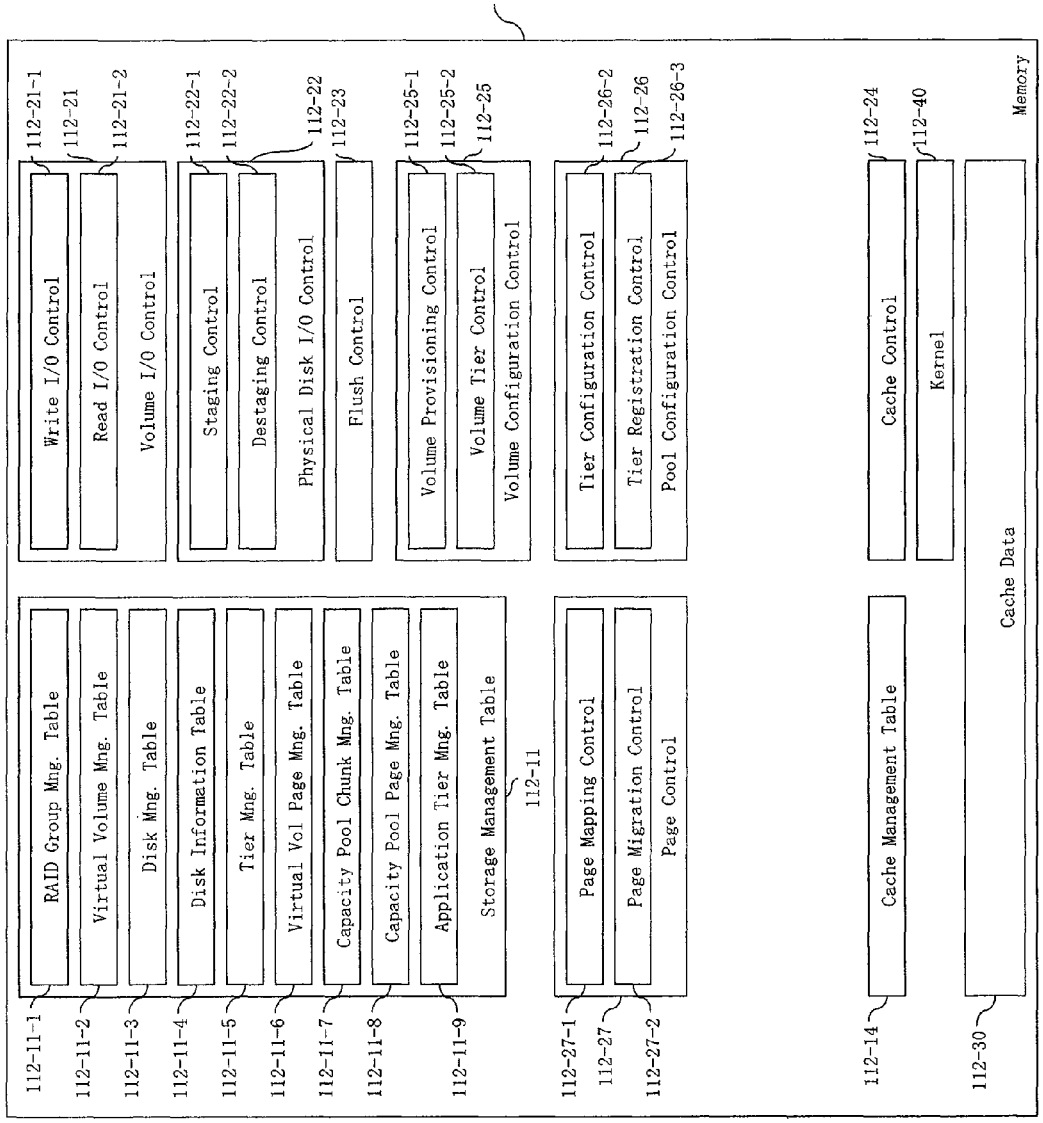
FIG. 2 illustrates an example of a memory in the storage subsystem of FIG. 1 according to the first embodiment.

FIG. 2 illustrates an example of the memory 112 in the storage subsystem 100 of FIG. 1 according to the first embodiment. A Storage Management Table 112-11 includes a RAID Group Management Table 112-11-1 (FIG. 5) for physical structure management for the disks 121 and those groups, a Virtual Volume Management Table 112-11-2 (FIG. 6) for volume configuration management, a Disk Management Table 112-11-3 (FIG. 3) for disk configuration management of the disks 121, a Disk Information Table 112-11-4 (FIG. 4) to provide a disk information database, a Tier Management Table 112-11-5 (FIG. 7) for capacity pool tier management wherein each capacity pool tier is organized according to the tier configuration rule (see Configuration Rule 112-11-5-5 in FIG. 7), a Virtual Volume Page Management Table 112-11-6 (FIG. 8) for reference management from a partition of a virtual volume to a partition of a capacity pool, a Capacity Pool Chunk Management Table 112-11-7 (FIG. 9) for resource management of a capacity pool and for reference management from a capacity pool page to a virtual volume page, a Capacity Pool Page Management Table 112-11-8 (FIG. 10) for resource management of a capacity pool chunk, and an Application Tier Management Table 112-11-9 (FIG. 11) for management the tier number with respect to the application ID of an application. The memory 112 further includes a Cache Management Table 112-14 (FIG. 12) for managing a Cache Data Area 112-30 stored in the memory 112 and for LRU/MRU management.

Figure 18:
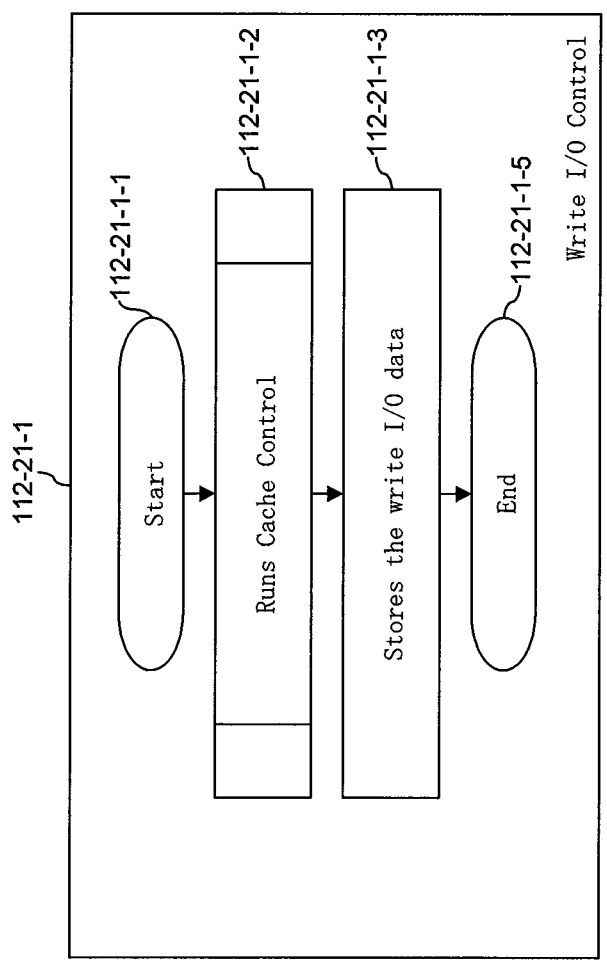
FIG. 18 illustrates an example of a process flow of the Write I/O Control according to the first embodiment.
Figure 19:
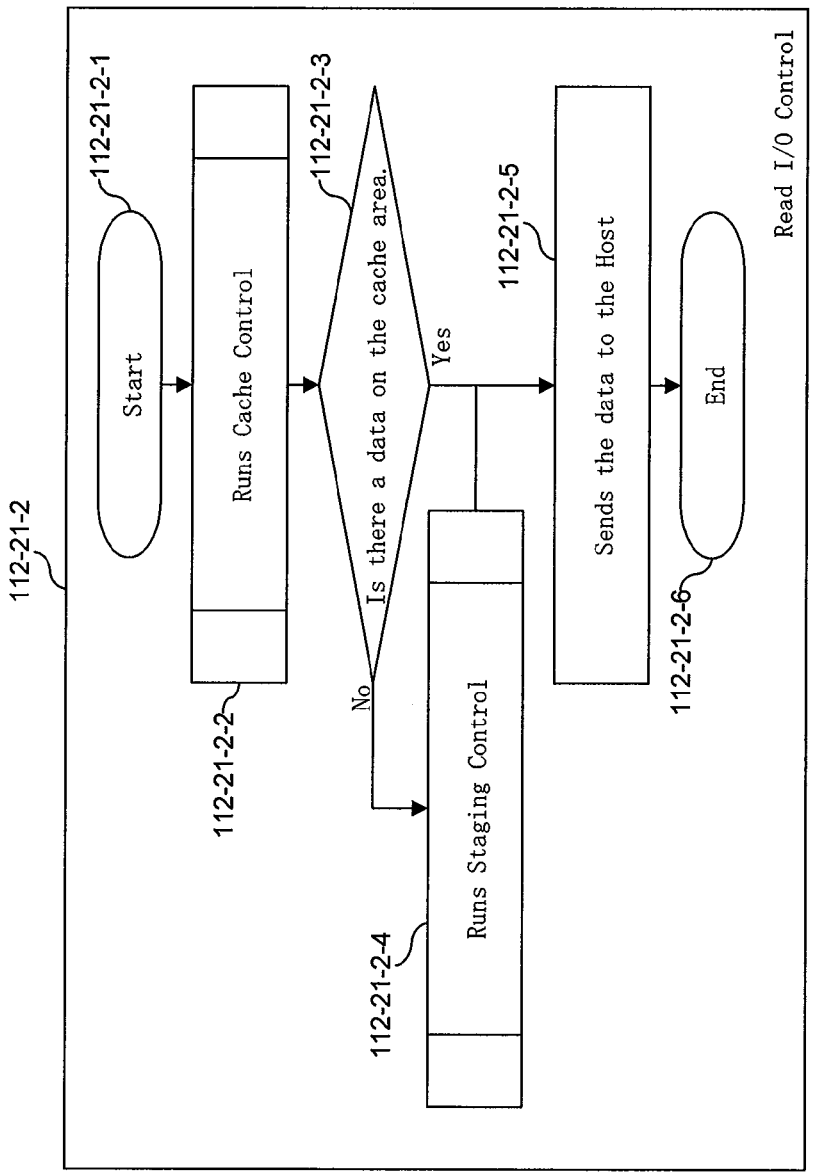
FIG. 19 illustrates an example of a process flow of the Read I/O Control.

A Volume I/O Control 112-21 includes a Write I/O Control 112-21-1 (FIG. 18) and a Read I/O Control 112-21-2 (FIG. 19). The Write I/O Control 112-21-1 runs by a write I/O requirement, and receives write data and stores it to the Cache Data Area 112-30 via the channel interface 113. The Read I/O Control 112-21-2 runs by a read I/O requirement, and sends read data from the Cache Data Area 112-30 via the channel interface 113. A Physical Disk Control 112-22 includes a Staging Control 112-22-1 (FIG. 20) for transferring data from the disks 121 to the Cache Data Area 112-30, and a Destaging Control 112-22-2 (FIG. 21) for transferring data from the Cache Data Area 112-30 to the disks 121. A Flush Control 112-23 (FIG. 22) periodically flushes dirty data in the Cache Data Area 112-30 to the disks 121.

A Volume Configuration Control 112-25 includes a Volume Provisioning Control 112-25-1 (FIG. 24) for provisioning new virtual volumes, and a Volume Tier Control 112-25-2 (FIG. 25) for changing configuration of volumes. A Pool Configuration Control 112-26 includes a Tier Configuration Control 112-26-2 (FIG. 26) for changing tier configurations when the tier rule is changed, and a Tier Registration Control 112-26-3 (FIG. 27) for registering capacity pool chunks to a tier according to the following tier configuration. A Page Control 112-27 includes a Page Mapping Control 112-27-1 (FIG. 28) for allocating a new capacity pool page to a virtual volume page, or searching a capacity pool page to which a virtual page links, and a Page Migration Control 112-27-2 (FIG. 29) for copying a capacity pool page to another capacity pool page and changing the link between the virtual volume page and the capacity pool page. A Cache Control 112-28 (FIG. 23) finds cached data in the Cache Data Area 112-30, and allocates a new cache area in the Cache Data Area 112-30. A Kernel 112-40 controls the schedules of running program. The Cache Data Area 112-30 stores read and write cache data, and is separated into plural cache slots.

2. Table Structures

FIG. 3 illustrates an example of the Disk Management Table 112-11-3. The Disk Management Table 112-11-3 includes columns of Disk Number 112-11-3-1 containing the ID of the disk 121, RAID Group Number 112-11-3-2 containing the ID of a RAID Group to which the Disk 121 belongs, and Model Information 112-11-3-3 containing the model number of the disk 121.

FIG. 4 illustrates an example of the Disk Information Table 112-11-4. The Disk Information Table 112-11-4 has columns of Model Information 112-11-4-1 containing the model number of the disk model, Disk Type Information 112-11-4-2 containing the data-storing type of the disk model (e.g., HDD or SSD), RPM information 112-11-4-3 containing revolution per minute information of HDD (If the model is not HDD, this element stores "–"), Cell information 112-11-4-4 containing cell type information of SSD (If the model is not SSD, this element stores "–"), Interface Information 112-11-4-5 containing the interface type of the disk model, Platter Capacity Information 112-11-4-6 containing the capacity of a platter of the disk model (If the model is not HDD, this element stores "–"), and Physical Capacity Information 112-11-4-7 containing the capacity of the disk model.

FIG. 5 illustrates an example of the RAID Group Management Table 112-11-1. The RAID Group Management Table 112-11-1 has columns of RAID Group Number 112-11-1-1 containing the ID of the RAID Group, and RAID Level 112-11-1-2 containing the structure of RAID Group. "N(=10, 5, 6, etc)" means "RAID Level is N." "N/A" means the RAID Group does not exist. The Table 112-11-1 further includes columns of Disk Number 112-11-1-3 containing the ID list of disks 121 belonging to the RAID Group, RAID Group Capacity 112-11-1-4 containing the total capacity of the RAID Group except the redundant area, Tier Number 112-11-1-5 containing the tier number to which the RAID Group belongs, Access Counter 112-11-1-6 containing the access counter to the RAID Group, Free Chunk Queue Index 112-11-1-7 containing the parameter for managing unused thin provisioning chunks, and Used Chunk Queue Index 112-11-1-8 containing the parameter for managing used thin provisioning chunks.

FIG. 6 illustrates an example of the Virtual Volume Management Table 112-11-2. The Virtual Volume Management Table 112-11-2 has columns of Volume Number 112-11-2-1 containing the ID of the volume, Volume Capacity 112-11-2-2 containing the capacity of the volume ("N/A" means the volume does not exist), Using RAID Group Number 112-11-2-3 containing the RAID Group ID which the volume currently uses, Using Chunk Number 112-11-2-5 containing the Chunk ID that the virtual volume currently uses, Tier Number 112-11-2-6 containing the Tier ID from which the virtual volume allocates a capacity pool page.

FIG. 7 illustrates an example of the Tier Management Table 112-11-5. The Tier Management Table 112-11-5 has columns of Tier Number 112-11-5-1 containing the ID of the volume, Total Capacity 112-11-5-2 containing the total capacity of RAID groups in the tier, Used Capacity 112-11-5-3 containing the total used capacity pool page of the tier, RAID Group List 112-11-5-4 containing the RAID Group ID list in the tier, and Configuration Rule 112-11-5-5 containing the configuration rule for grouping the tier. The RAID groups in the tier match the configuration rule. The configuration rule is based on factors such as disk type, disk interface type, performance, RAID level, number of disks, etc.

FIG. 8 illustrates an example of the Virtual Volume Page Management Table 112-11-6. The Virtual Volume Page Management Table 112-11-6 includes columns of Virtual Volume Page Index 112-11-6-1 containing the top address of the virtual volume page, RAID Group Number 112-11-6-2 containing the RAID Group ID to which the virtual volume page belongs ("N/A" means no capacity pool page is allocated to the virtual volume page), Capacity Pool Page Index 112-11-6-3 containing the top address of a capacity pool page to which the virtual volume page refers, I/O Counter 112-11-6-4 containing the access counter to disks in the virtual volume page, Counter Cleared Time 112-11-6-5 containing the start time of the access count, and Page Owner Application ID 112-11-6-6 containing the ID of the application which accesses the page.

FIG. 9 illustrates an example of the Capacity Pool Chunk Management Table 112-11-7. The Capacity Pool Chunk Management Table 112-11-7 has columns of Capacity Pool Chunk Number 112-11-7-1 containing the ID of the capacity pool chunk, Virtual Volume Number 112-11-7-2 containing the ID of a virtual volume by which the capacity pool chunk is referred, Used Capacity 112-11-7-3 containing the used capacity of the capacity pool chunk, Deleted Capacity 112-11-7-4 containing the removed capacity of the capacity pool chunk once the area has been used, Previous Chunk Number 112-11-7-5 containing the previous chunk pointer for queue management ("NULL" means a head of the queue), and Next Chunk Number 112-11-7-6 containing the next chunk pointer for queue management ("NULL" means a terminal of the queue).

FIG. 10 illustrates an example of the Capacity Pool Page Management Table 112-11-8. The Capacity Pool Page Management Table 112-11-8 includes columns of Capacity Pool Page Index 112-11-8-1 containing the ID of the capacity pool page, and Virtual Volume Page Number 112-11-8-2 containing the ID of a virtual volume page by which the capacity pool page is referred. "NULL" means the capacity pool page is unused.

FIG. 11 illustrates an example of an Application Tier Management Table 112-11-9. The Table 112-11-9 includes a column for Application ID 112-11-9-1 containing the ID of an application, and a column for Tier Number 112-11-9-2 containing the tier number data to which the application is stored.

FIG. 12 illustrates an example of the Cache Management Table 112-14. The Cache Management Table 112-14 has columns of Cache Slot Number 112-14-1 as an index containing the ID of the cache slot in Cache Data Area 112-30, Volume Number 112-14-2 containing the ID of the volume such as disk 121 in which the cache slot stores a data, Disk Address 112-14-3 containing the disk address (e.g., LBA) at which the cache slot stores the data, Next Slot Pointer 112-14-4 containing the next cache slot number for queue management ("NULL" means a terminal of the queue), I/O Counter 112-14-7 containing the I/O counter for the cache slot, and Application ID 112-14-8 containing the ID of an application if present. The column of Kind of Queue Information 112-14-5 contains the kind of cache slot queue. "Free" means a queue that has the unused cache slots. "Clean" means a queue that has cache slots that stores the same data as the disk slots. "Dirty" means a queue that has cache slots that store different data from the data in the disk slots, indicating that the storage controller 110 needs to flush the cache slot data to the disk slot in the future. The column of Queue Index Pointer 112-14-6 contains the index of the cache slot queue.

3. Logical Structures

Figure 13:
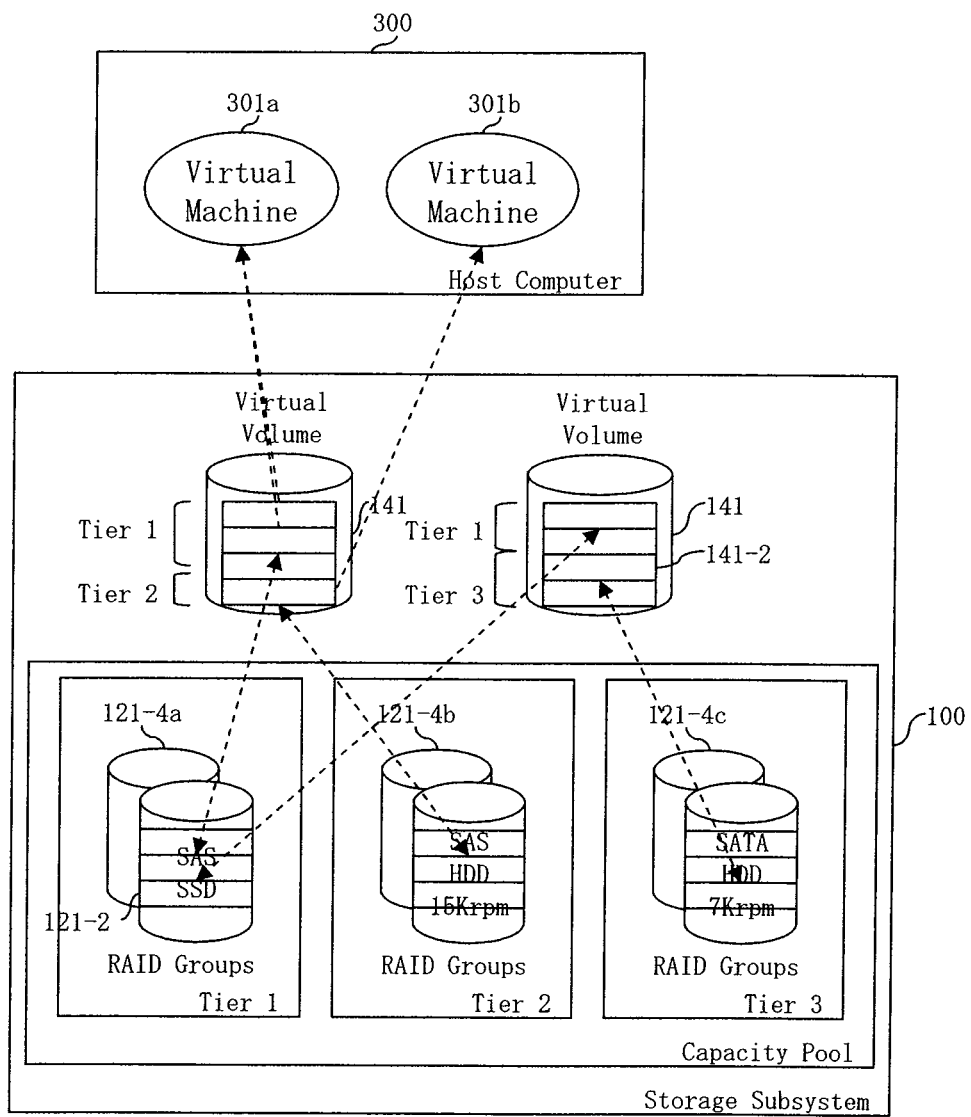
FIG. 13 illustrates a summary of the logical storage configuration of the storage subsystem according to the first embodiment.

FIG. 13 illustrates a summary of the logical storage configuration of the storage subsystem 100 according to the first embodiment. The storage subsystem 100 includes virtual volumes 141 which can be accessed by the host computer 300. Each virtual volume 141 has a plurality of virtual volume pages 141-2. Each virtual volume page 141-2 refers to a capacity pool page 121-2 of a capacity pool. The capacity pool has a plurality of RAID Groups 121-4. Each RAID group 121-4 contains a group of disks 121. The storage subsystem 100 has several types of RAID groups 121-4a, 121-4b, 121-4c, which are grouped or classified into tiers (Tier 1, Tier 2, Tier 3) based on the RAID group type. These tiers belong to the capacity pool. The virtual volumes 141 are likewise identified by the tiers. A plurality of applications 301 (301a, 301b, etc.) run on the host computer 300. Each application 301 has an Application ID, which may be, for example, IP Address, WWPN (World Wide Port Number), or the like. This ID is succeeded (i.e., retained) when the application 301 migrates to another host computer. Each application 301 accesses certain virtual volume 141 at a certain tier.

Figure 14:
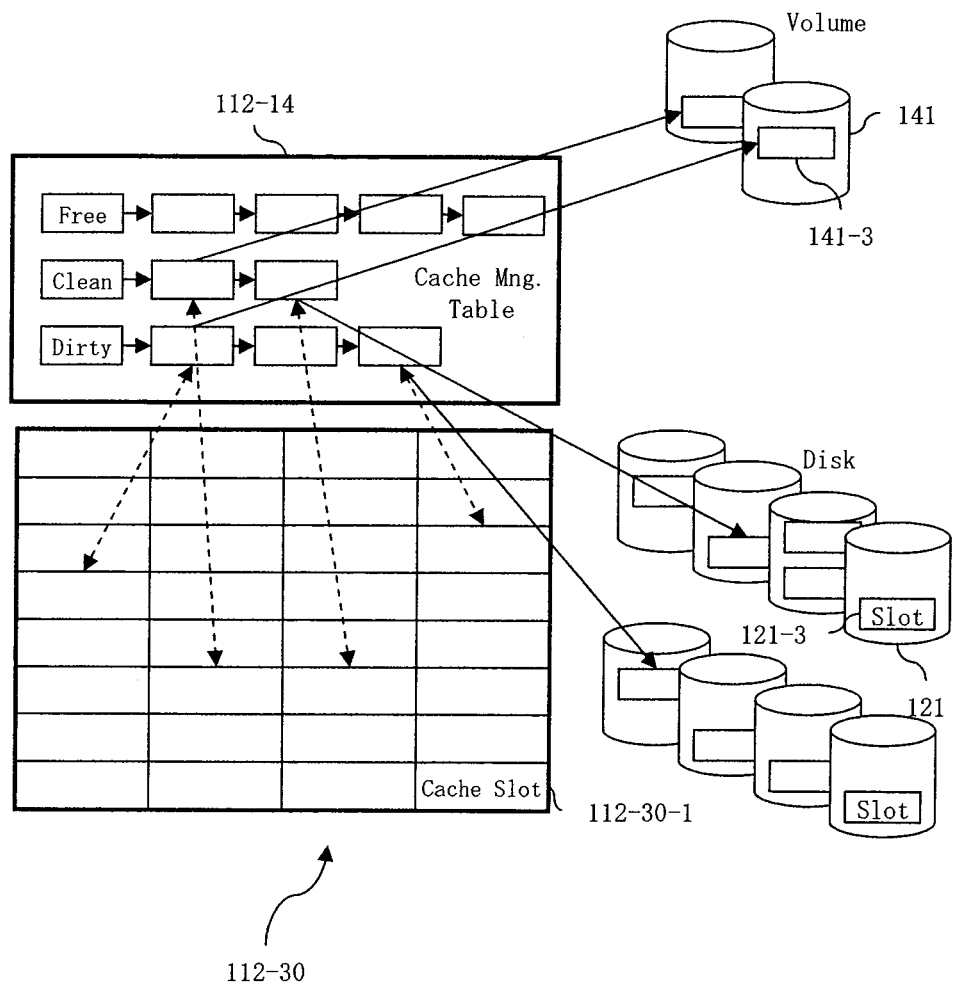
FIG. 14 illustrates an example of the logical structure of the Cache Area.

FIG. 14 illustrates an example of the logical structure of the Cache Area 112-30. The arrowed lines include dashed lines which mean that an object refers by pointer, and solid lines which mean that an object refers by calculation. The Cache Data Area 112-30 is divided into plural cache slots 112-30-1. The size of a cache slot 112-30-1 equals to the size of a Capacity Pool Stripe 121-3 and the size of a Virtual Volume Slot 141-3. The Cache Management Table 112-18 and the cache slot 112-30-1 are on a one-to-one relation. The Cache Management Table 112-18 refers to the Virtual Volume Slot 141-3 and it can resolve Capacity Pool Stripe 121-3 by using the RAID Group Management Table 112-11-1.

Figure 15:
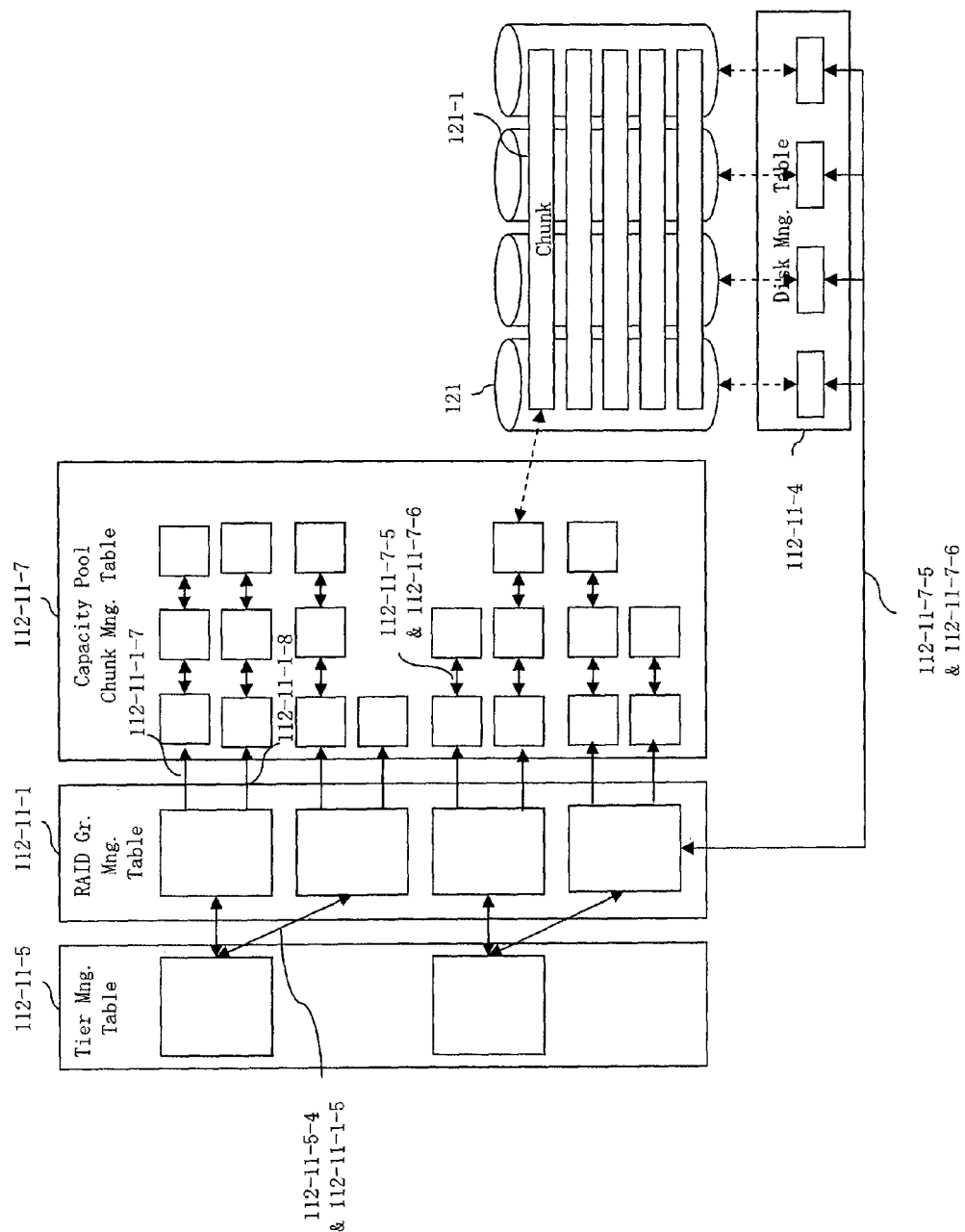
FIG. 15 illustrates an example of the logical structure of a capacity pool chunk according to the first embodiment.

FIG. 15 illustrates an example of the logical structure of a capacity pool chunk 121-1 according to the first embodiment. The arrowed lines include solid lines which mean that an object refers by pointer, and dashed lines which mean that an object refers by calculation. For the tiers, the Tier Management Table 112-11-5 refers to the RAID Group Management Tables 112-11-1. For the RAID groups, the RAID Group Management Table 112-11-1 refers to the Tier Management Table 112-11-5, refers to the Disk Management Tables 112-11-3 of the belonged disks, and refers to the Capacity Pool Chunk Management Table 112-11-7 by Free Chunk Queue 112-15-03 and Used Chunk Queue 112-15-04. For the capacity pool chunks 121-1, the relations of the capacity pool chunks 121-1 and the Capacity Pool Chunk Management Table 112-11-7 are fixed.

Figure 16:
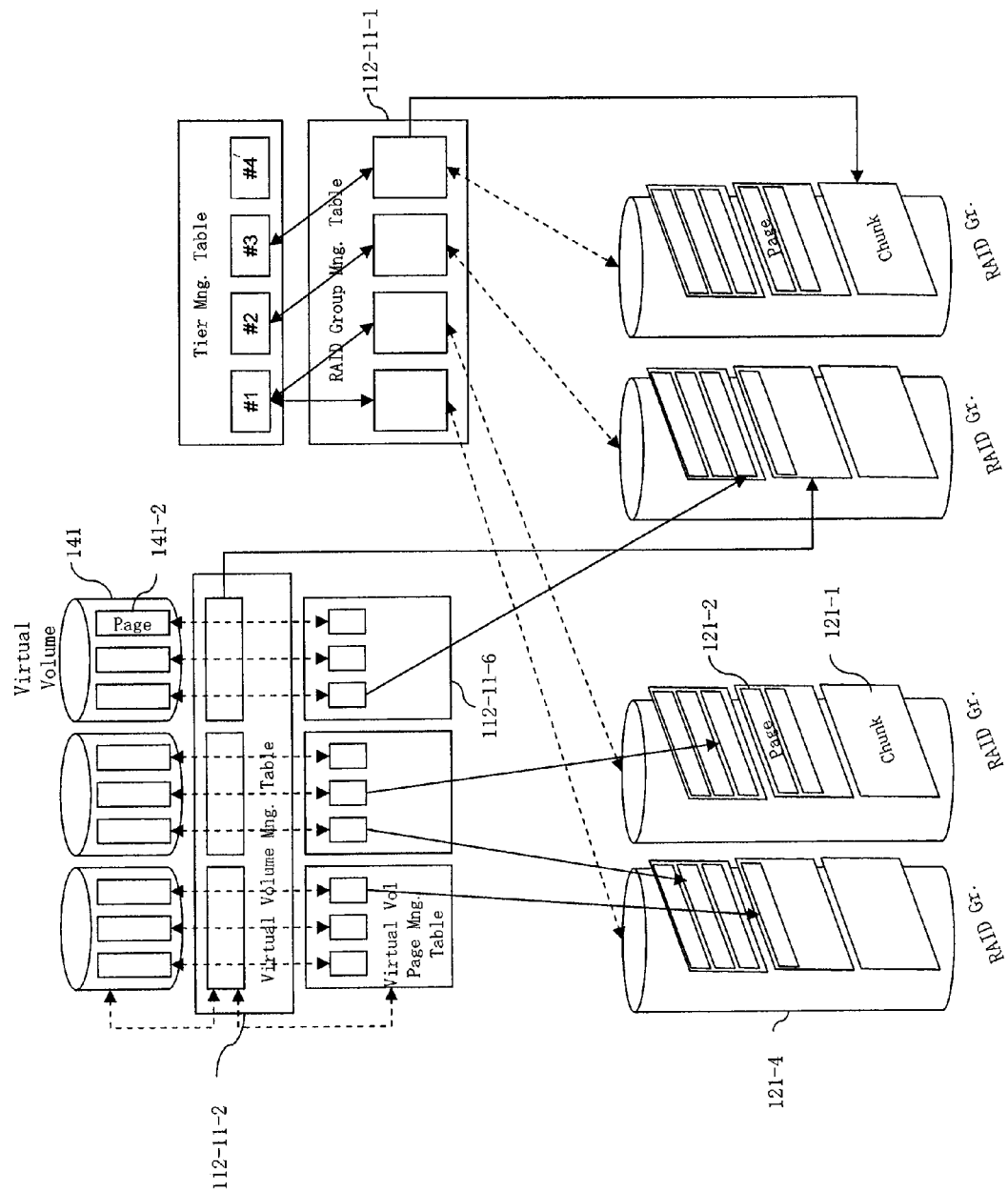
FIG. 16 illustrates an example of table reference structure toward the capacity pool.

FIG. 16 illustrates an example of table reference structure toward the capacity pool. The arrowed lines include solid lines which mean that an object refers by pointer, and dashed lines which mean that an object refers by calculation. For the virtual volumes 141, the virtual volumes 141 and the Virtual Volume Management Table 112-11-2 are on a one-to-one relation. The Virtual Volume Management Table 112-11-2 refers to current using capacity pool pages 121-2. For the virtual volume pages 141-2, the virtual volume pages 141-2 and the Virtual Volume Page Management Table 112-11-6 are on a one-to-one relation. The Virtual Volume Page Management Table 112-11-6 refers to a slice of the capacity pool pages 121-2, if a page is allocated. For the RAID groups, the RAID groups and the RAID Group Management Table 112-11-1 are on a one-to-one relation. The RAID Group Management Table 112-11-1 refers to used and unused capacity pool chunks 112-1.

Figure 17:
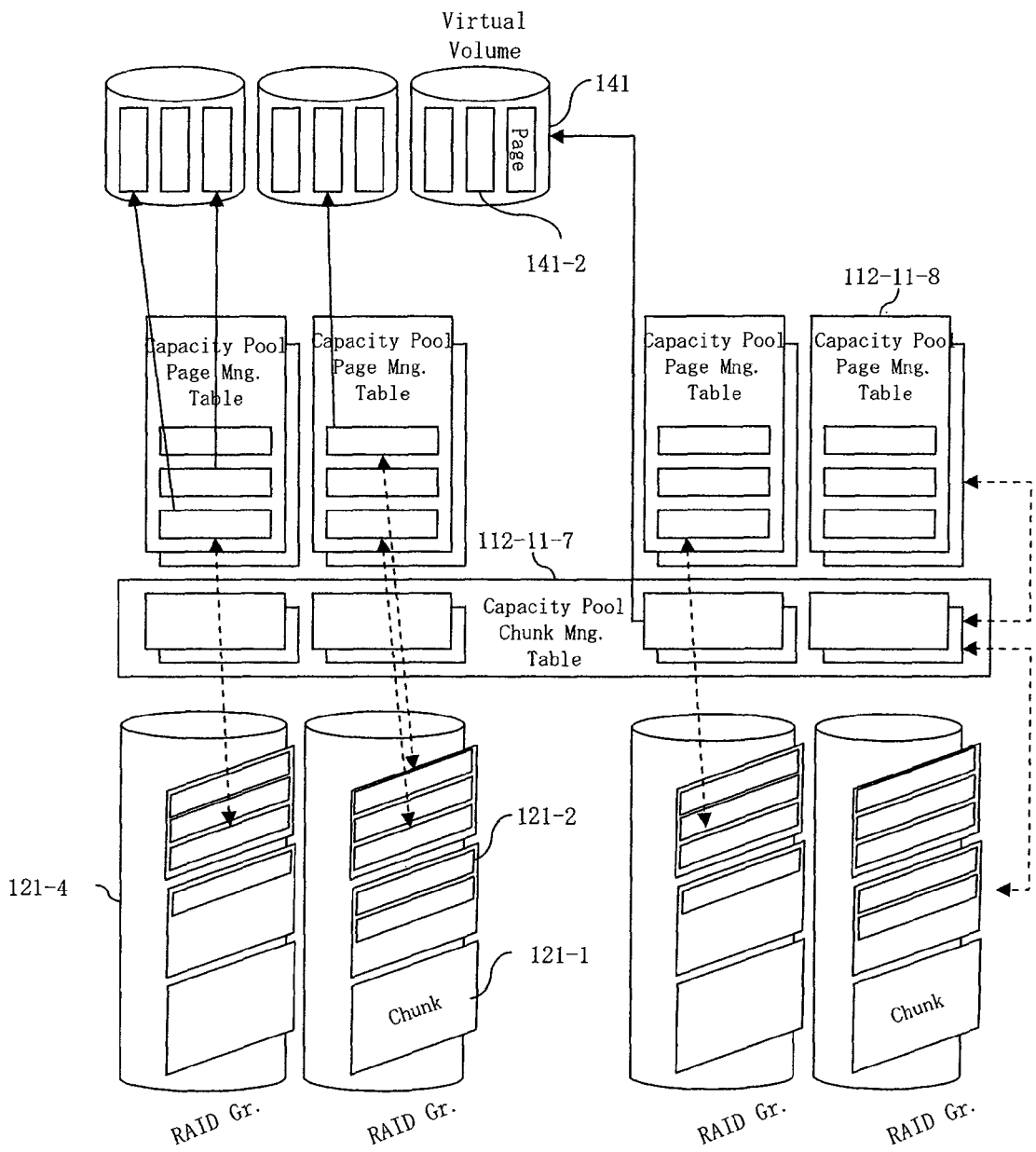
FIG. 17 illustrates an example of table reference structure toward the virtual volumes.

FIG. 17 illustrates an example of table reference structure toward the virtual volumes 141. The arrowed lines include solid lines which mean that an object refers by pointer, and dashed lines which mean that an object refers by calculation. For the capacity pool chunks 121-1, the capacity pool chunks 121-1 and the Capacity Pool Chunk Management Table 112-11-7 are on a one-to-one relation. The Capacity Pool Chunk Management Table 112-11-7 refers to the virtual volumes 141. For the capacity pool pages 121-2, the Capacity Pool Page Management Table 112-11-8 refers to the virtual volume pages 141-2.

4. Process Flow Diagrams

FIG. 18 illustrates an example of a process flow of the Write I/O Control 112-21-1 according to the first embodiment. The program starts in step 112-21-1-1. In step 112-21-1-2, the program calls the Cache Control 112-28 to search the cache slot 112-30-1. In step 112-21-1-3, the program receives the write I/O data from the host computer 300 and stores it to the aforesaid cache slot 112-30-1. The program ends in step 112-21-1-5.

FIG. 19 illustrates an example of a process flow of the Read I/O Control 112-21-2. The program starts in step 112-21-2-1. In step 112-21-2-2, the program calls the Cache Control 112-28 to search the cache slot 112-30-1. In step 112-21-2-3, the program checks the status of the aforesaid cache slot 112-30-1 to determine whether the data has already been stored there or not. In step 112-21-2-4, the program calls the Staging Control 112-22-1 (see FIG. 20). In step 112-21-2-5, the program transfers the data in the cache slot 112-30-1 to the host computer 300. The program ends in step 112-21-2-6.

Figure 20:
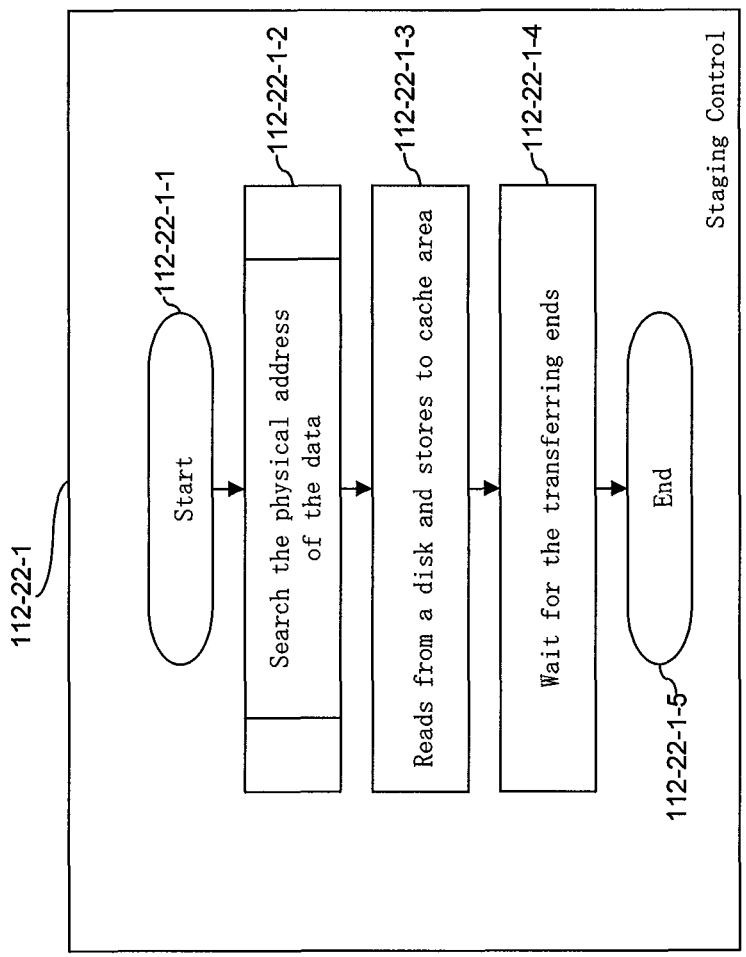
FIG. 20 illustrates an example of a process flow of the Staging Control.

FIG. 20 illustrates an example of a process flow of the Staging Control 112-22-1. The program starts in step 112-22-

1-1. In step 112-22-1-2, the program calls the Page Mapping Control 112-27-1 to search a capacity pool page 121-2 for the virtual volume page. In step 112-22-1-3, the program reads data from a slot in the disk 121 and stores it to the Cache Data Area 112-30. In step 112-22-1-4, the program waits for the data transfer to end. The program ends in step 112-22-1-5.

Figure 21:
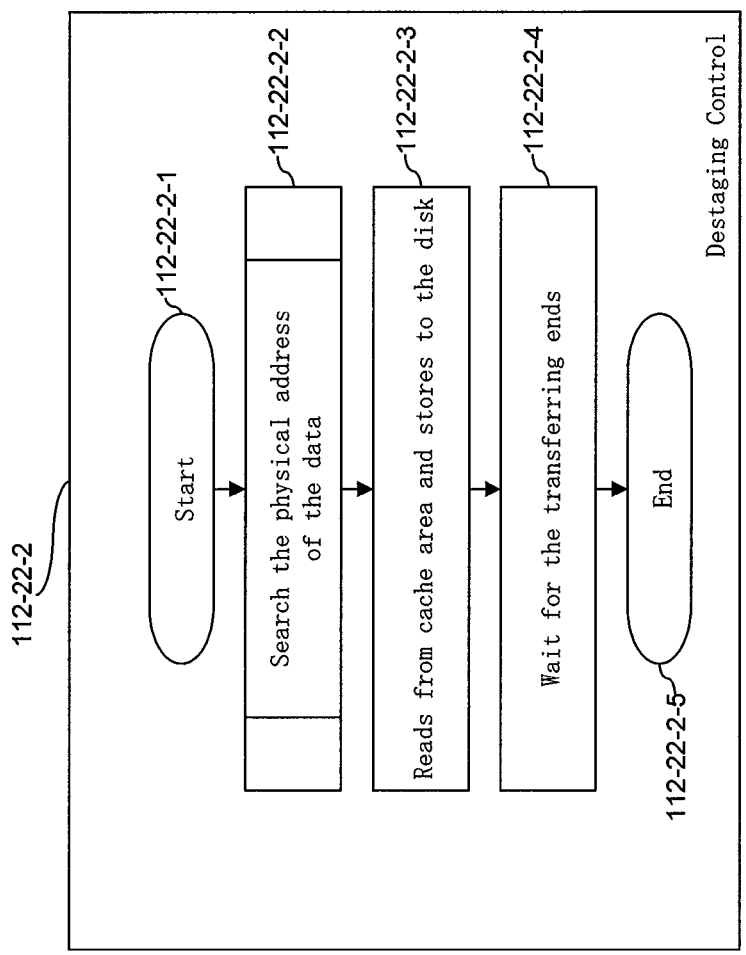
FIG. 21 illustrates an example of a process flow of the Destaging Control.

FIG. 21 illustrates an example of a process flow of the Destaging Control 112-22-2. The program starts in step 112-22-2-1. In step 112-22-2-2, the program calls the Page Mapping Control 112-27-1 to search or allocate a capacity pool page 121-2 for the virtual volume page. In step 112-22-2-3, the program reads data from a slot in the Cache Data Area 112-30 and stores it to the disk 121. In step 112-22-2-4, the program waits for the data transfer to end. The program ends in step 112-22-2-5.

Figure 22:
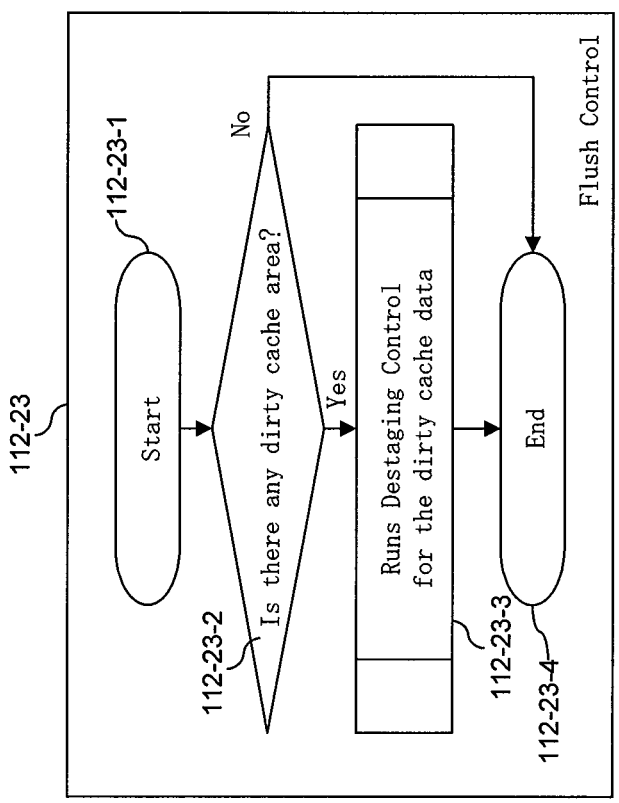
FIG. 22 illustrates an example of a process flow of the Flush Control.

FIG. 22 illustrates an example of a process flow of the Flush Control 112-23. The program starts in step 112-23-1. In step 112-23-2, the program reads the "Dirty Queue" of the Cache Management Table 112-14. In step 112-23-3, the program calls the Destaging Control 112-22-2 to destage the found dirty cache slot. The program skips step 112-23-3 if no dirty cache slot is found. The program ends in step 112-23-4.

Figure 23:
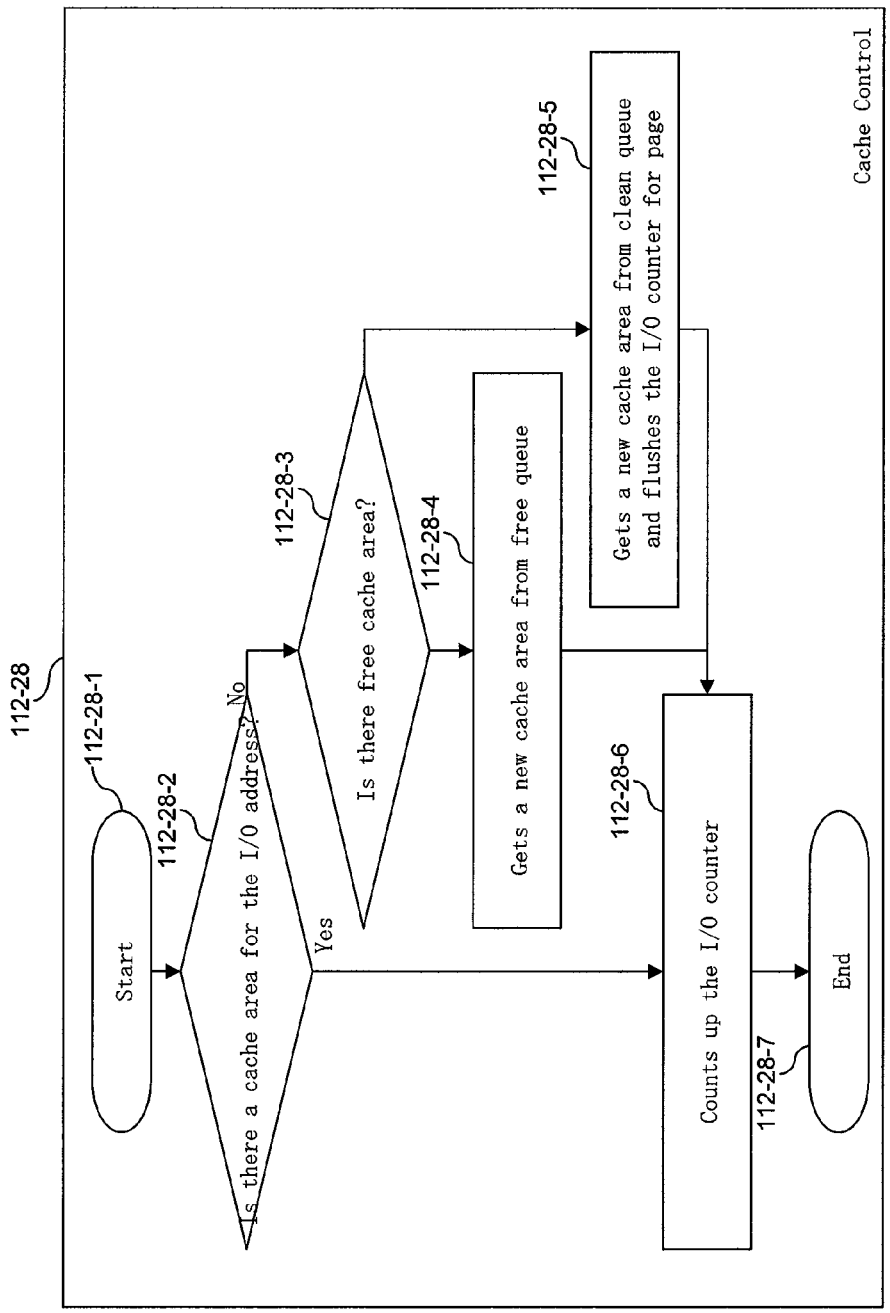
FIG. 23 illustrates an example of a process flow of the Cache Control.

FIG. 23 illustrates an example of a process flow of the Cache Control 112-28. The program starts in step 112-28-1. In step 112-28-2, the program searches a cache slot of a designated address. If a cache slot is found, the program proceeds to step 112-28-6. If not, the program proceeds to step 112-28-3. In step 112-28-3, the program checks to determine whether a free cache slot remains or not. If there is a free cache slot, the program gets a new cache slot from free queue for the designated address in step 112-28-4. If not, the program selects a clean cache slot, counts up the I/O counter of the virtual volume page of the clean cache slot, purges the clean slot, and allocates the cache slot for the designated address in step 112-28-5. Finally, in step 112-28-6, the program counts up the I/O Counter or Access Counter 112-14-7. The program ends in step 112-28-7.

Figure 24:
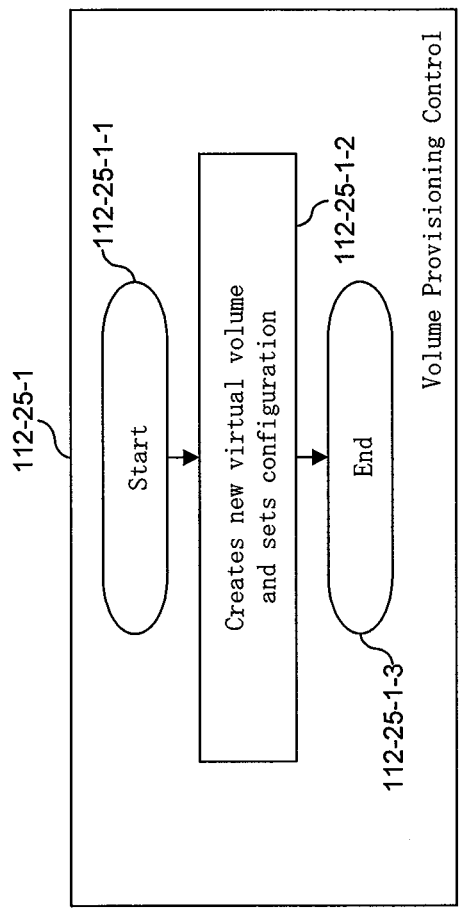
FIG. 24 illustrates an example of a process flow of the Volume Provisioning Control.

FIG. 24 illustrates an example of a process flow of the Volume Provisioning Control 112-25-1. The program starts in step 112-25-1-1. In step 112-25-1-2, the program registers the virtual volume information to the Virtual Volume Management Table 112-11-2. The virtual volume information includes volume number, volume capacity, and volume tier number. The program ends in step 112-25-1-3.

Figure 25:
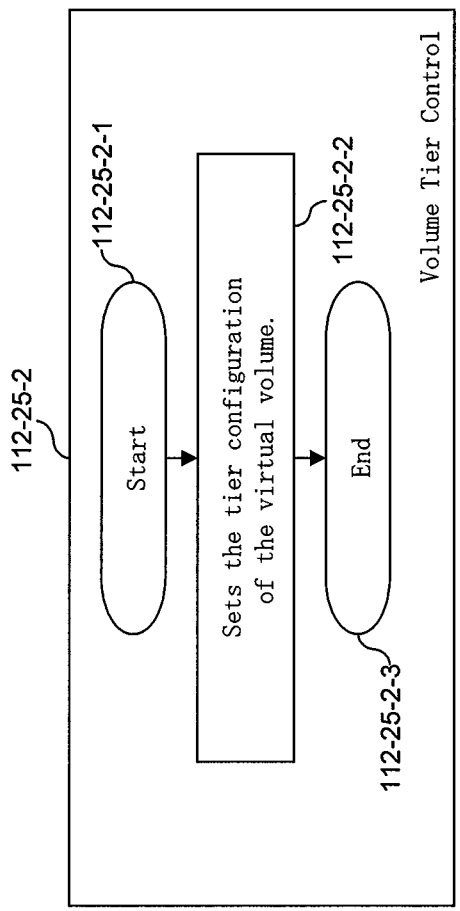
FIG. 25 illustrates an example of a process flow of the Volume Tier Control.

FIG. 25 illustrates an example of a process flow of the Volume Tier Control 112-25-2. The program starts in step 112-25-2-1. In step 112-25-2-2, the program changes the virtual volume tier information in the Virtual Volume Management Table 112-11-2. The program ends in step 112-25-2-3.

Figure 26:
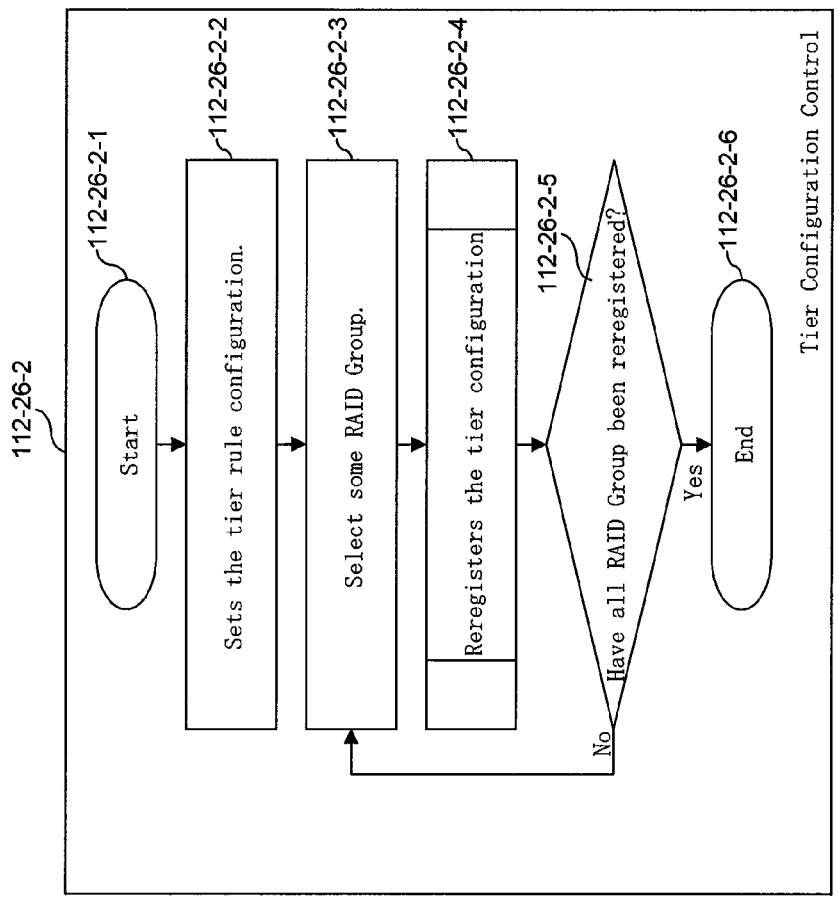
FIG. 26 illustrates an example of a process flow of the Tier Configuration Control.

FIG. 26 illustrates an example of a process flow of the Tier Configuration Control 112-26-2. The program starts in step 112-26-2-1. In step 112-26-2-2, the program registers the tier rule to the Tier Management Table 112-11-5 to set the tier rule configuration. In step 112-26-2-3, the program selects a RAID group in the capacity pool. In step 112-26-2-4 for reregistering the tier configuration, the program calls the Tier Registration Control 112-26-3 (see FIG. 27) to change a tier of the RAID group in accordance with the registered tier rule. In step 112-26-2-5, the program loops back to repeat steps 112-26-2-3 to 112-26-2-5 until all RAID groups are processed. The program ends in step 112-26-2-6.

Figure 27:
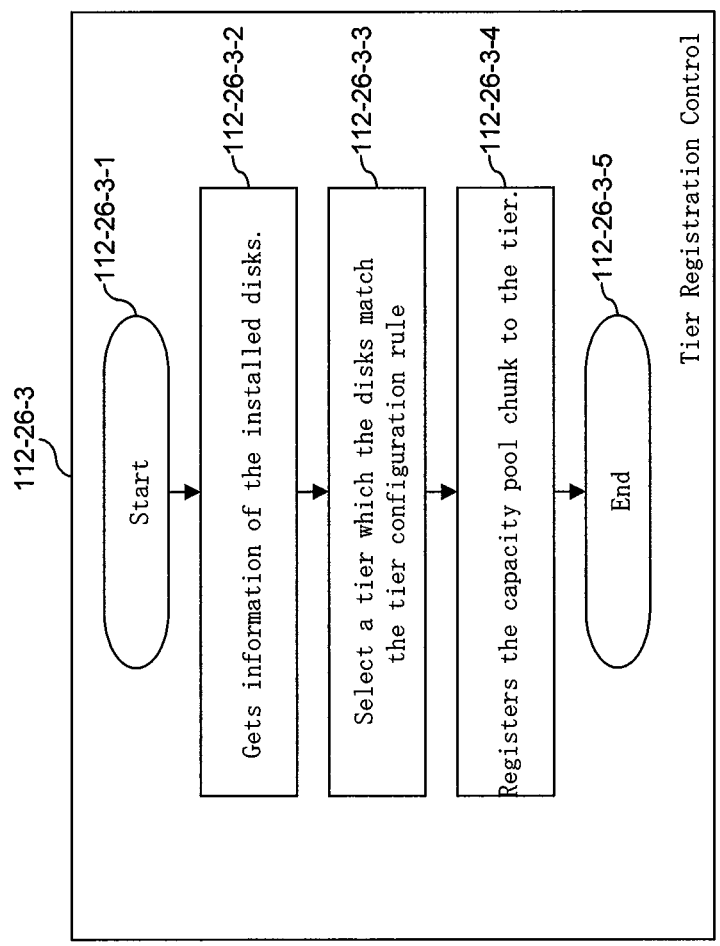
FIG. 27 illustrates an example of a process flow of the Tier Registration Control.

FIG. 27 illustrates an example of a process flow of the Tier Registration Control 112-26-3. The program starts in step 112-26-3-1. In step 112-26-3-2, the program gets the disk information of the RAID group from the Disk Management Table 112-11-3 and the Disk Information Table 112-11-4. In step 112-26-3-3, the program checks the tier rule in the Tier Management Table 112-11-5 and selects a matched tier for the RAID group by matching the tier rule. In step 112-26-3-4 for registering the capacity pool chunk to the tier, the program registers the tier information to the RAID Group Management Table 112-11-1. The program ends in step 112-26-3-5.

Figure 28:
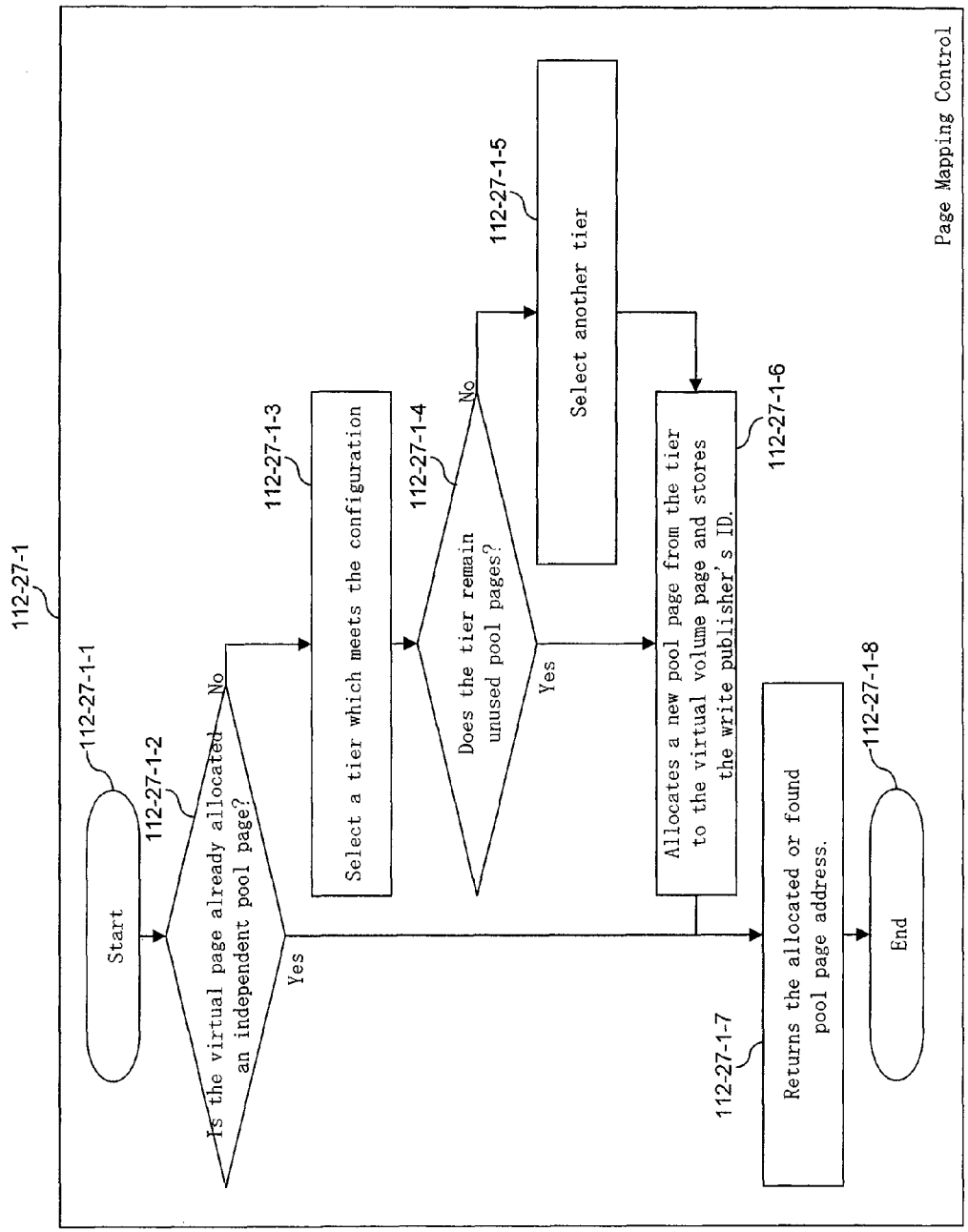
FIG. 28 illustrates an example of a process flow of the Page Mapping Control.

FIG. 28 illustrates an example of a process flow of the Page Mapping Control 112-27-1. The program starts in step 112-27-1-1. In step 112-27-1-2, the program checks if the designated virtual page has already been allocated a capacity pool page 121-2. In step 112-27-1-3 for selecting a tier which meets the tier configuration, the program selects the requiring tier for the virtual volume page. In step 112-27-1-4, the program checks to determine whether the selected tier has free or unused capacity pool pages or not. If there are free pages, the program allocates a new capacity pool page to the virtual volume page from a RAID group in the selected tier and stores the Application ID of the application which published write I/O to the page in step 112-27-1-6. If there are no free pages, the program first selects another (capacity remaining) tier in step 112-27-1-5 before proceeding to step 112-27-1-6. In step 112-27-1-7, the program returns the allocated or found capacity pool page information. The program ends in step 112-27-1-8.

Figure 29:
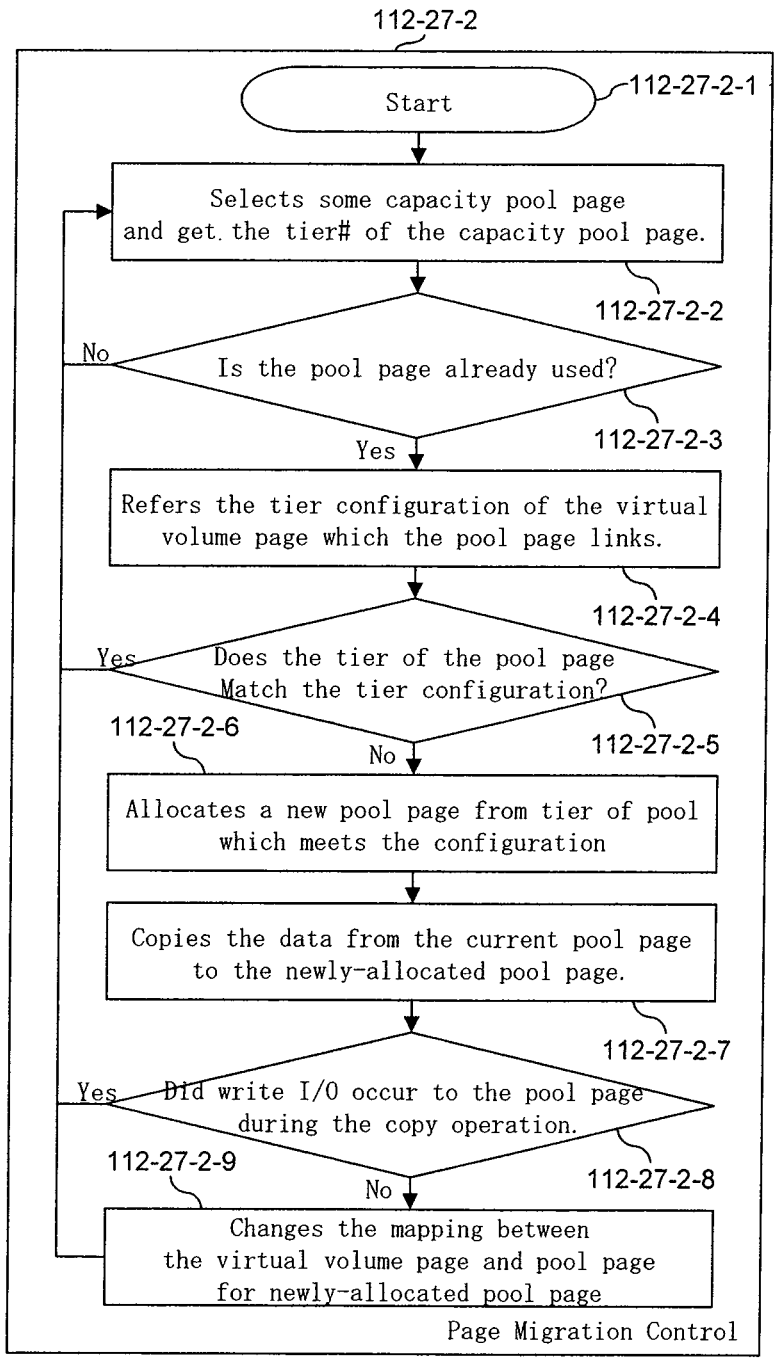
FIG. 29 illustrates an example of a process flow of the Page Migration Control.

FIG. 29 illustrates an example of a process flow of the Page Migration Control 112-27-2. The program starts in step 112-27-2-1. In step 112-27-2-2, the program selects a capacity pool page 121-2 and gets the information including the tier number. In step 112-27-2-3, the program checks to determine whether the capacity pool page is already used. If not, the program returns to step 112-27-2-2. If the capacity pool page 121-2 is not used, the program gets the virtual volume page information of the capacity pool page in step 112-27-2-4 by referring to the tier configuration of the virtual volume page. In step 112-27-2-5, the program checks to determine whether the capacity pool page 121-2 belongs to a correct (configured) tier with matched tier configuration. If so, the program returns to step 112-27-2-2. If no, the program the program allocates a new capacity pool page from a RAID group that belongs to correct tier with matched tier configuration in step 112-27-2-6. In step 112-27-2-7, the program copies the data from the current capacity pool page to the newly allocated capacity pool page. In step 112-27-2-8, the program checks if write I/O occurred to the virtual volume page during the copy operation. If so, the program returns to step 112-27-2-2. If no, the program changes the link or mapping between the virtual volume page and the capacity pool page for the newly allocated pool page in step 112-27-2-9.

5. Frame Structure

Figure 30:
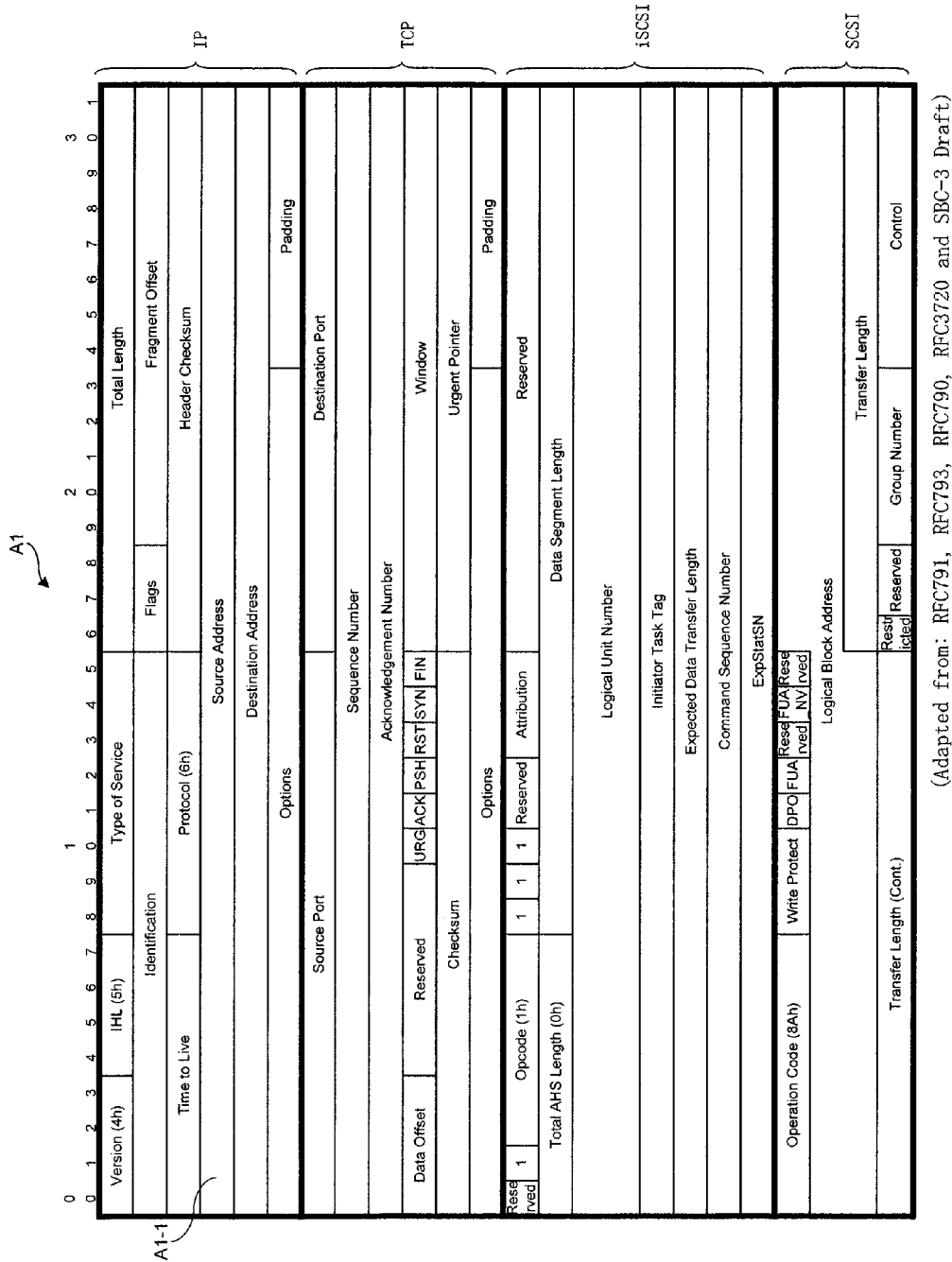
FIG. 30 illustrates an example of a write I/O frame structure from the host computer according to the first embodiment.

FIG. 30 illustrates an example of a write I/O frame structure from the host computer 300 according to the first embodiment. FIG. 30 shows an "iSCSI" frame structure, in which the frame A1 is an iSCSI frame that includes IP, TCP, and SCSI protocol. The Application ID A1-1 is an ID of an application that publishes the write I/O. That ID is an IP address set to the application in this embodiment.

6. Sequence

Figure 31:
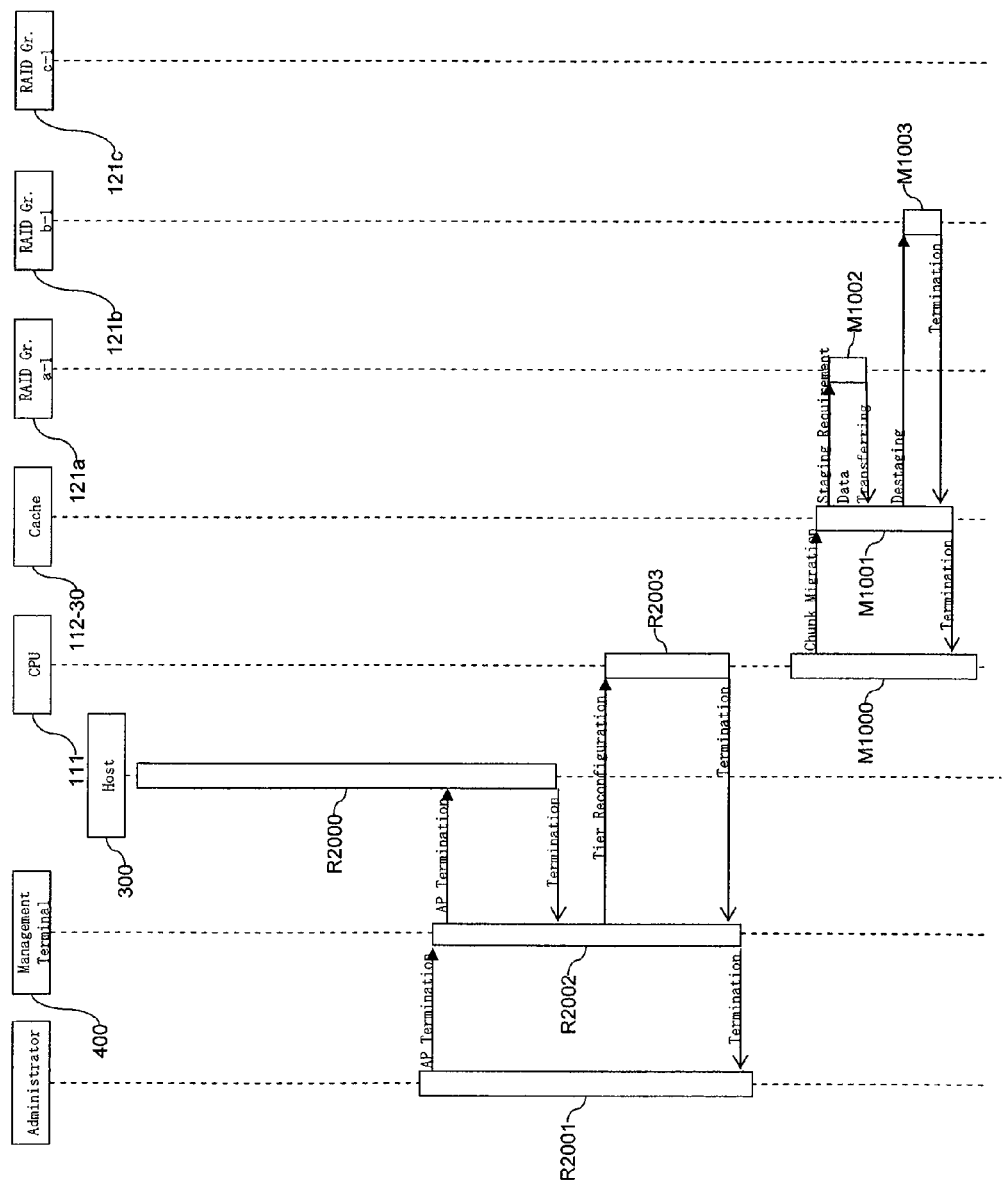
FIG. 31 illustrates an example of a sequence of application termination and tier changing according to the first embodiment.

FIG. 31 illustrates an example of a sequence of application termination and tier changing according to the first embodiment. In M1000, the CPU 111 finds a virtual volume page using a capacity pool page in an unmatched tier, and copies the capacity pool page to a newly allocated capacity pool page using the Cache Area 112-30. In M1001, the Cache Area 112-30 receives data from the disk 121*c* and transfers the data to the disk 121*b*. In M1002, the disk 121 sends the data to the Cache Area 112-30. In M1003, the disk 121 stores the received data from the Cache Area 112-30.

In R2000, the host computer 300 is using an application, and receives a termination requirement from the administrator via the system management terminal 500. In R2001, the administrator requires the termination of the application via the system management terminal 500. In R2002, the system management terminal 500 sends the termination requirement to the host computer 300. The system management terminal 500 sends a tier changing requirement to the storage subsystem 100 for the area in which the application data is stored. In R2003, the CPU 111 changes the tier of the designated area in the designated virtual volume.

Second Embodiment

In the second embodiment of the invention, a different frame structure is used. Only the differences with respect to the first embodiment are described.

Figure 32:
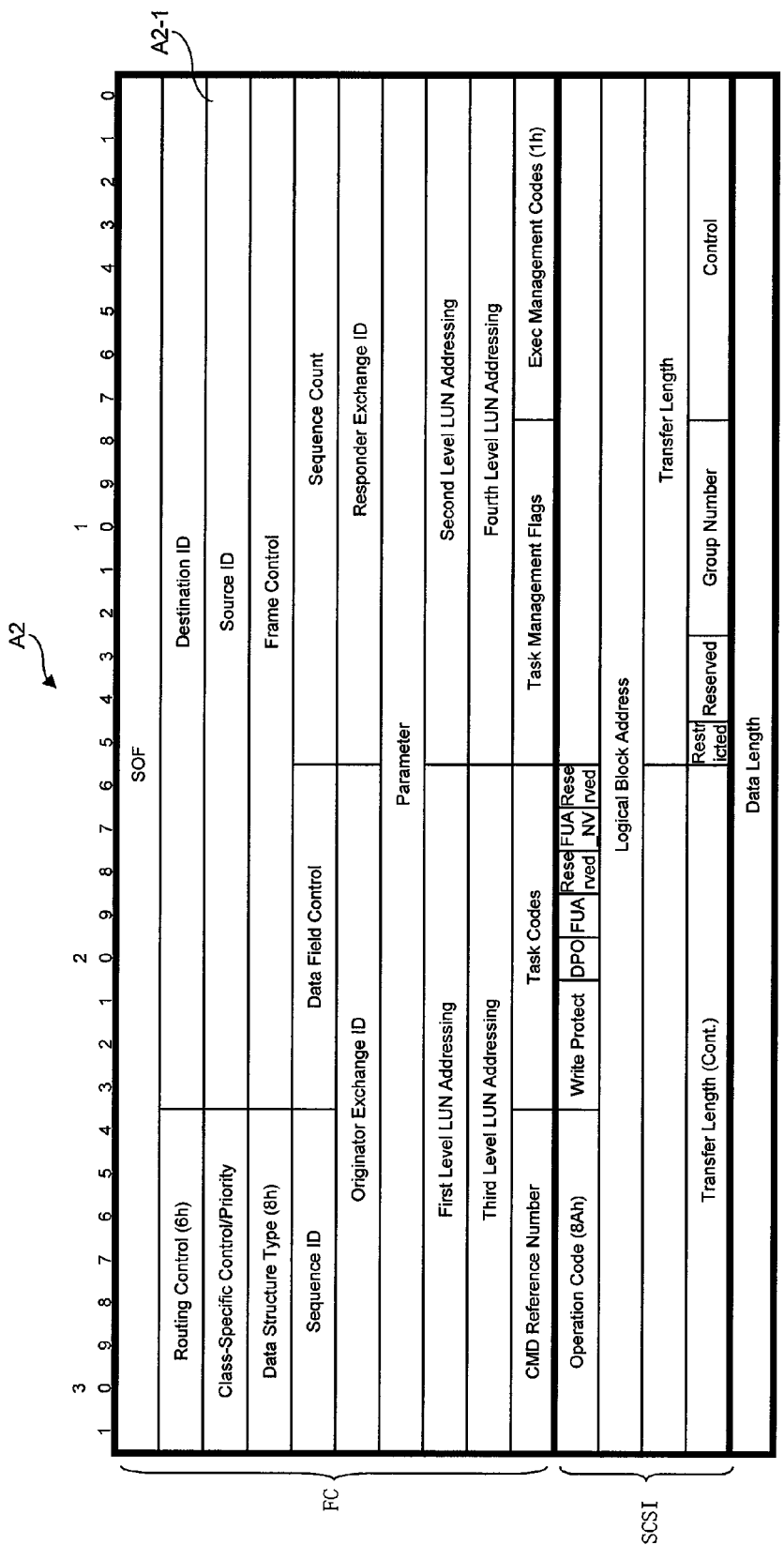
FIG. 32 illustrates an example of a write I/O frame structure from the host computer according to a second embodiment of the invention.

FIG. 32 illustrates an example of a write I/O frame structure from the host computer according to the second embodiment. FIG. 32 shows an "FC (Fibre Channel)" frame structure, in which the frame A2 is an FC frame. The Application ID A2-1 is an ID of an application that publishes the write I/O. That ID is an FCID. The storage subsystems can search the WWPN (World Wide Port Number) of the application with this FCID by a request to a switch device in the storage network 300.

Third Embodiment

In the third embodiment of the invention, a different frame structure is used. Only the differences with respect to the second embodiment are described.

Figure 33:
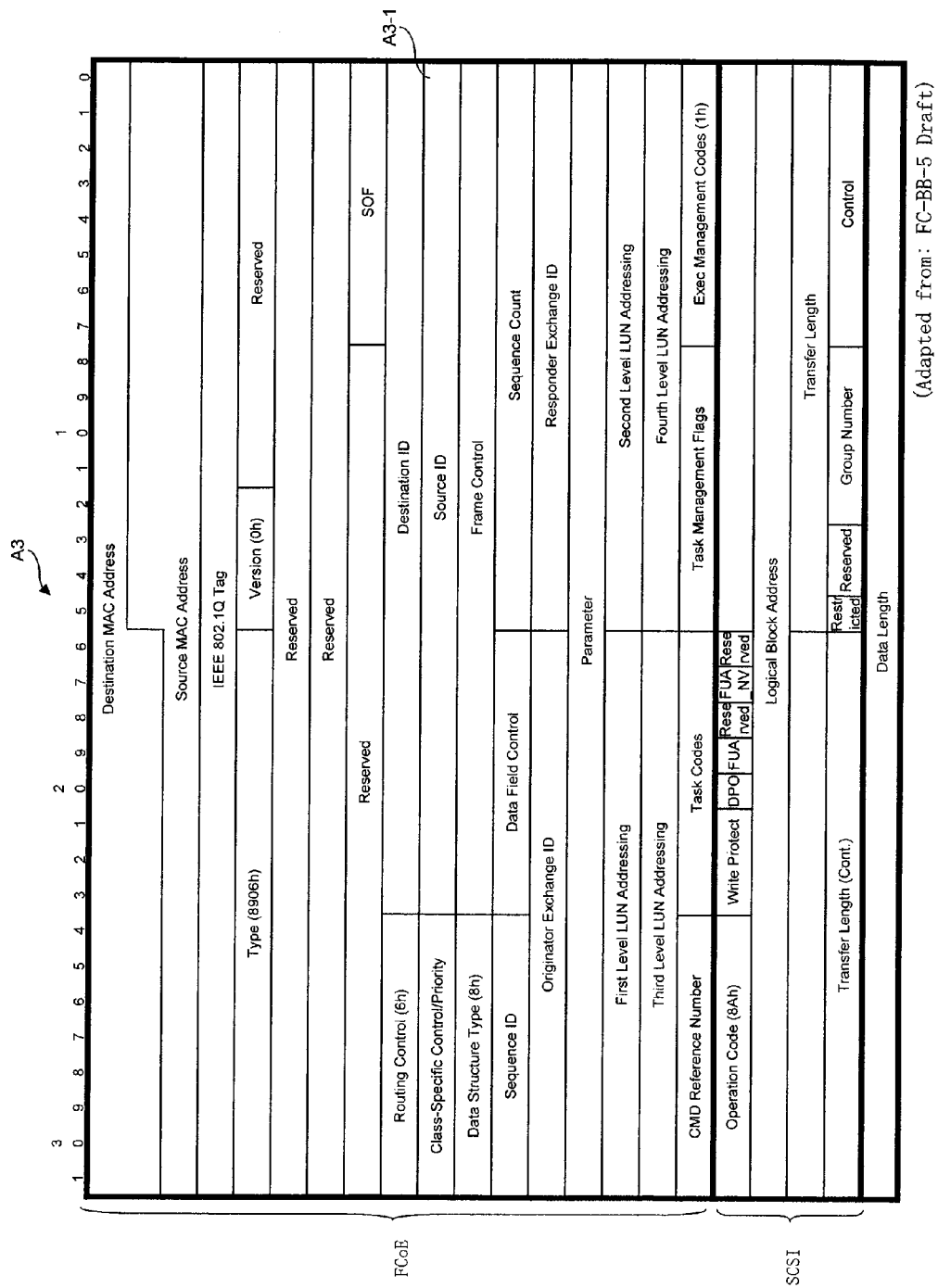
FIG. 33 illustrates an example of a write I/O frame structure from the host computer according to a third embodiment of the invention.

FIG. 33 illustrates an example of a write I/O frame structure from the host computer according to the third embodiment. FIG. 32 shows an "FCoE (Fibre Channel over Ethernet)" frame structure, in which the frame A3 is an FCoE frame. The Application ID A3-1 is an ID of an application that publishes the write I/O. That ID is an FCID. The storage subsystems can search the WWPN (World Wide Port Number) of the application with this FCID by a request to a switch device in the storage network 300.

Fourth Embodiment

The fourth embodiment of the invention has a different system configuration, a different logical structure, different processes, and different sequences. Only the differences with respect to the first embodiment are described. In this embodiment, the system has a synchronous remote copy function. However asynchronous remote copy function is also useful.

1. System Configuration

Figure 34:
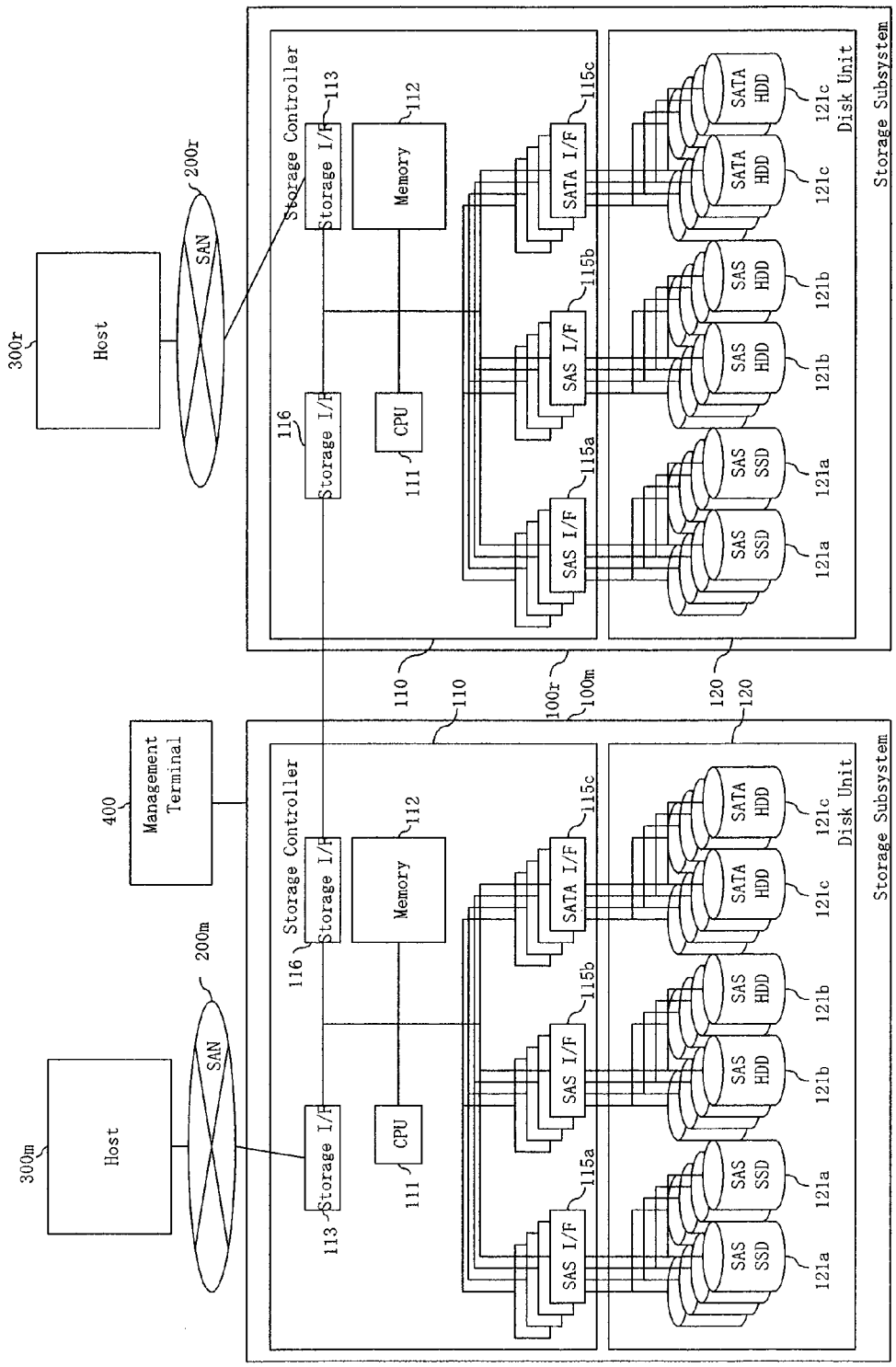
FIG. 34 illustrates the hardware configuration of a system in which the method and apparatus of the invention may be applied according to a fourth embodiment of the invention.

FIG. 34 illustrates the hardware configuration of a system in which the method and apparatus of the invention may be applied according to a fourth embodiment of the invention. A host computer 300m (same as the host computer 300 in FIG. 1) is connected to a storage subsystem 100m via a storage network 200m. Another host computer 300r (same as the host computer 300 in FIG. 1) is connected to another storage subsystem 100r via another storage network 200r. The storage networks 200m and 200r are each the same as the storage network 200 in FIG. 1. The storage subsystem 100m is similar to the storage subsystem 100 in FIG. 1, and includes a storage interface 116 for connecting to the storage subsystem 100r. The storage subsystem 100r is similar to the storage subsystem 100 in FIG. 1, and has a storage interface 116 for connecting to the storage subsystem 100m.

Figure 35:
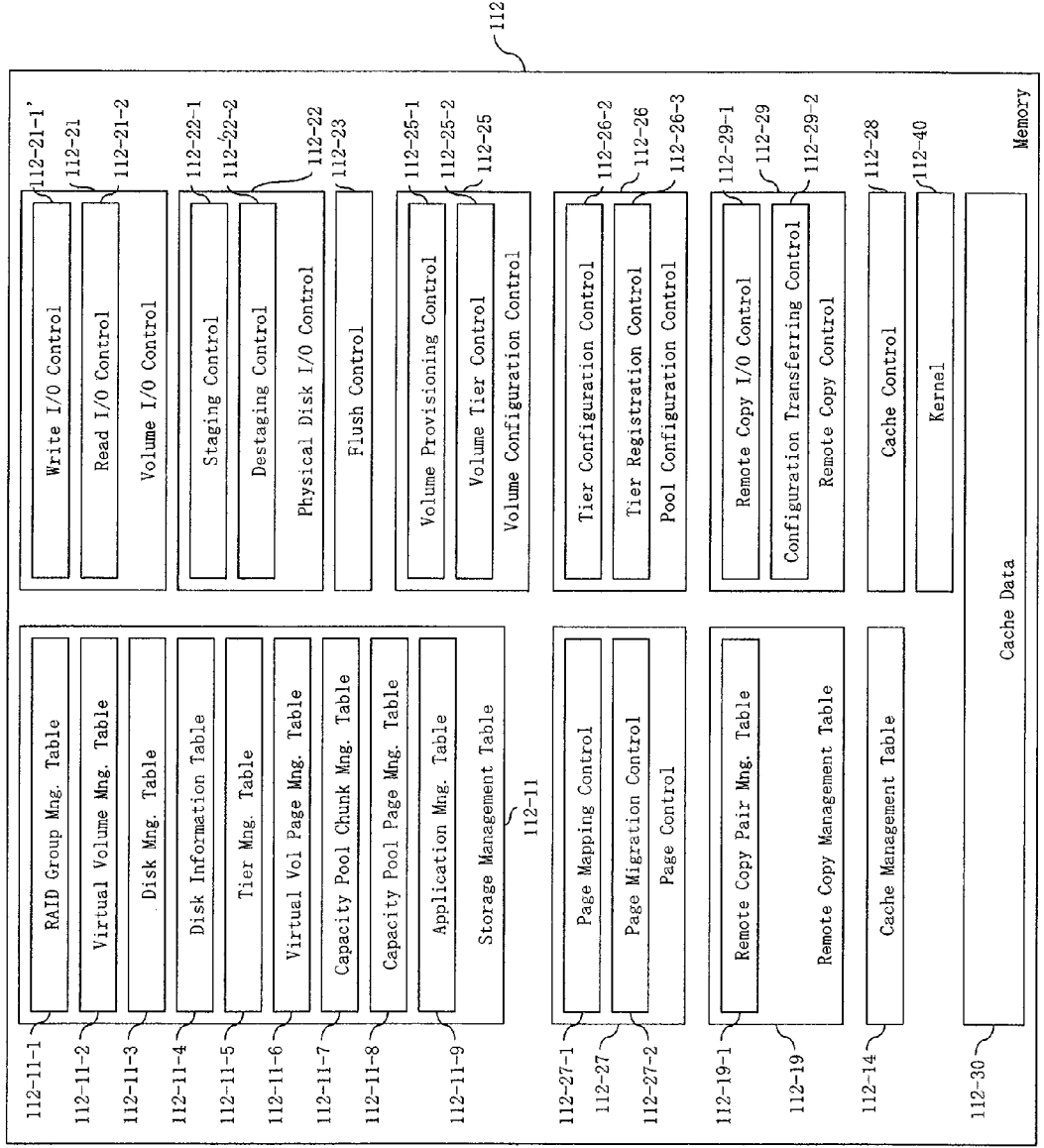
FIG. 35 illustrates an example of a memory in each storage subsystem of FIG. 34 according to the fourth embodiment.

FIG. 35 illustrates an example of a memory 112 in each storage subsystem 100m or 100r of FIG. 34 according to the fourth embodiment. As compared to FIG. 2, FIG. 35 has a different Write I/O Control 112-21-1', and includes a Remote Copy Management Table 112-19 and Remote Copy Control 112-29. The Remote Copy Management Table 112-19 includes a Remote Copy Pair Management Table 112-19-1. The Write I/O Control 112-21-1' runs by a write I/O requirement, and has a new remote copy related step. The Remote Copy Control 112-29 has Remote Copy I/O Control 112-29-1 for write I/O replication and transferring control, and Configuration Transferring Control 112-29-2 for virtual volume and virtual volume page configuration transferring control.

2. Logical Structure

FIG. 36 illustrates an example of the Remote Copy Pair Management Table 112-19-1. The Table 112-19-1 has a column for Volume Number 112-19-1-1 containing the ID of the volume and a column for Pair Status 112-19-1-2 containing the volume pair status. "PAIR" means two volumes between two storage subsystems have the same data. "SMPL" means the volume does not form a pair with another volume. "N/A" means the volume does not exist. The Table 112-19-1 further includes a column for Volume Attribution 112-19-3. "M-Vol" means a replication source volume. When this volume receives a write I/O, it replicates the write I/O to the paired volume. "R-Vol" means a replication target volume. "N/A" means the volume does not exist or does not form a pair with another volume. This attribution can be exchanged between paired volumes by user operation. The column for Remote Volume ID 112-19-1-4 contains the ID of the paired volume. "N/A" means the volume does not exist or does not form a pair with another volume.

3. Flow Diagrams

Figure 37:
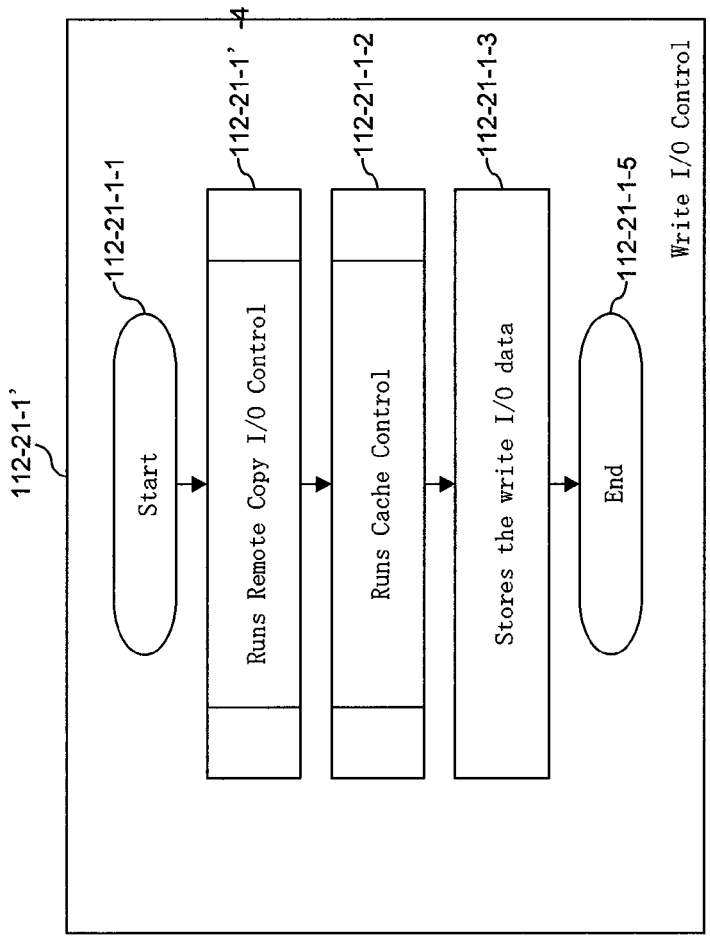
FIG. 37 illustrates an example of a process flow of the Write I/O Control according to the fourth embodiment.

FIG. 37 illustrates an example of a process flow of the Write I/O Control 112-21-1' according to the fourth embodiment. The program starts in step 112-21-1-1 as in FIG. 18, but then calls the Remote Copy I/O Control 112-29-1 in step 112-21-1'-4, prior to calling the Cache Control 112-28 in step 112-21-1-2 to search the cache slot 112-30-1 and receiving the write I/O data from the host computer 300 and stores it to the aforesaid cache slot 112-30-1 in step 112-21-1-3. The program ends in step 112-21-1-5.

Figure 38:
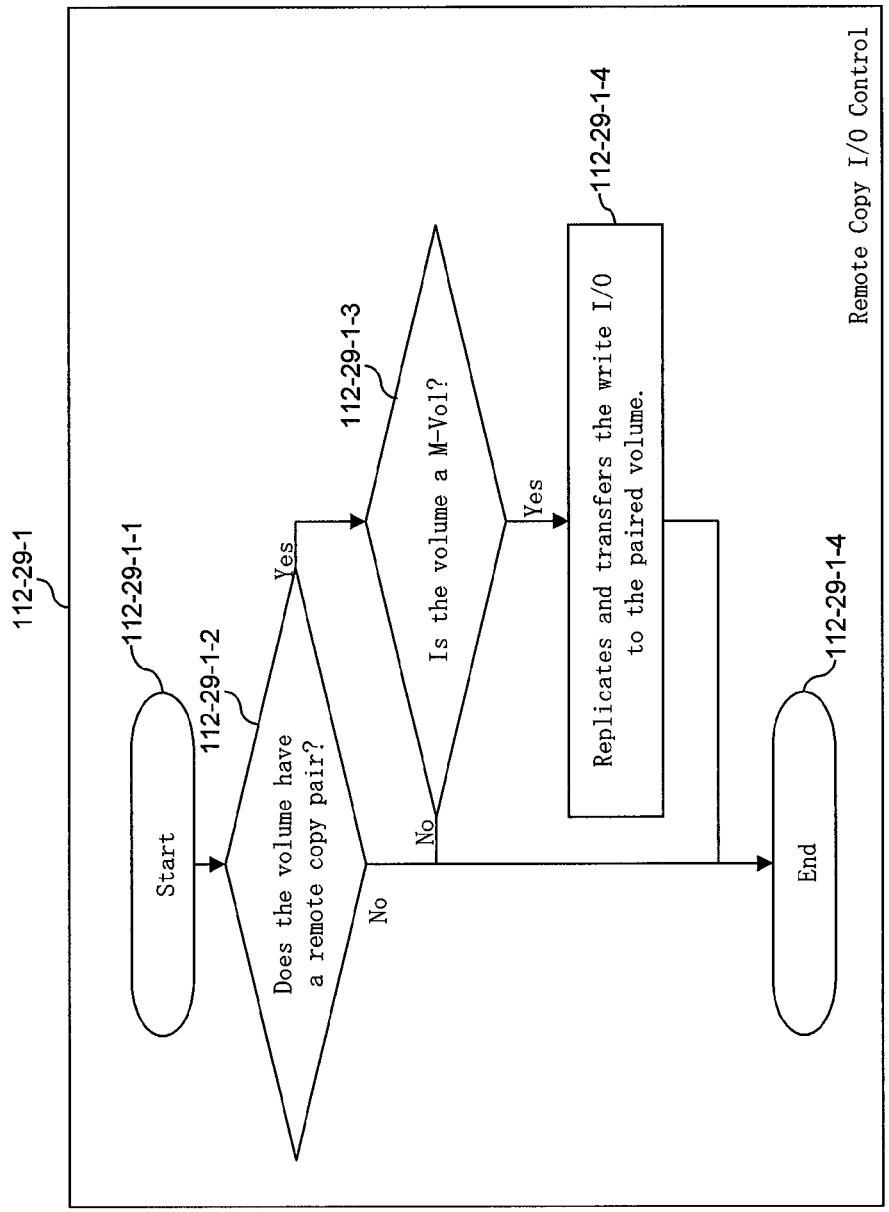
FIG. 38 illustrates an example of a process flow of the Remote Copy I/O Control.

FIG. 38 illustrates an example of a process flow of the Remote Copy I/O Control 112-29-1. The program starts in step 112-29-1-1. In step 112-29-1-2, the program checks to see whether the volume has a remote copy pair or not from the Remote Copy Pair Management Table 112-19-1. If no, the process ends in step 112-29-1-4. If yes, in step 112-29-1-3, the program checks to see if the attribution of the volume is "M-Vol" or not from the Remote Copy Pair Management Table 112-19-1. If no, the process ends. If yes, in step 112-29-1-4, the program replicates the received write I/O data and transfers it to the paired ("R-Vol" attributed) volume in the remote storage subsystem.

Figure 39:
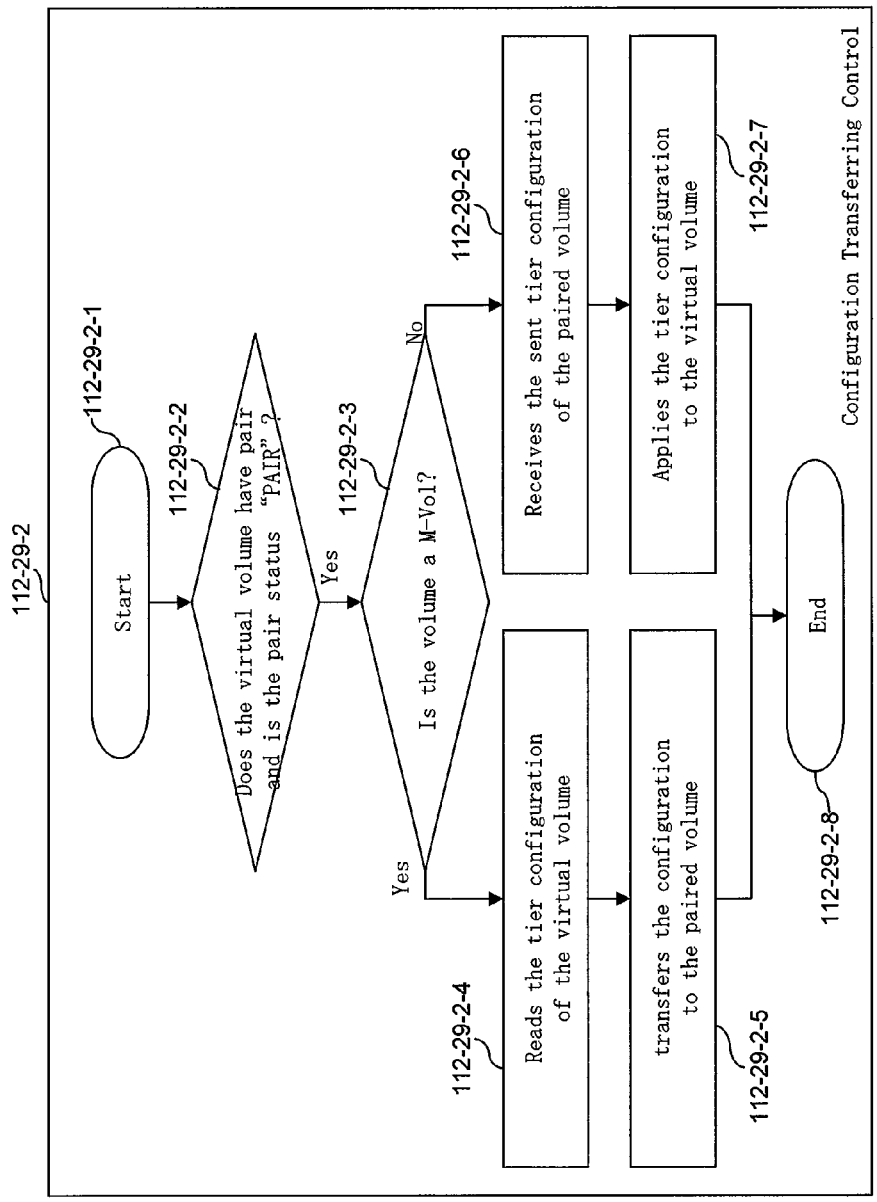
FIG. 39 illustrates an example of a process flow of the Configuration Transferring Control.

FIG. 39 illustrates an example of a process flow of the Configuration Transferring Control 112-29-2. The program starts in step 112-29-2-1. In step 112-29-2-2, the program checks whether the volume has remote copy pair or not from the Remote Copy Pair Management Table 112-19-1. If no, the process ends in step 112-29-2-8. In step 112-29-2-3, the program checks whether the volume attribution is "M-Vol" or "R-Vol." If the volume attribution is "M-Vol," the program reads the Volume Page Management Table 112-11-6 of the volume and the Application Tier Management Table 112-11-9 in step 112-29-2-4, and transfers the information of these tables to a remote storage subsystem to which the paired ("R-Vol") volume belongs in step 112-29-2-5. If the volume attribution is "R-Vol," the program receives table information from the remote storage subsystem to which the paired ("M-Vol") volume belongs in step 112-29-2-6, and overwrites the Page Owner Application ID 112-11-6-6 information of the volume and the Application Tier Management Table 112-11-9 in step 112-29-2-7. The process ends in step 112-29-2-8.

In step 112-29-2-4, the program can send relation information between a page and allocated tier instead of sending the information of the Volume Page Management Table 112-11-6 of the volume and the Application Tier Management Table 112-11-9. In this case, the program changes the tier allocation by calling the Page Migration Control 112-27-21 instead of overwriting the Page Owner Application ID 112-11-6-6 information of the volume and the Application Tier Management Table 112-11-9 at the remote storage subsystem.

4. Sequence

Figure 40:
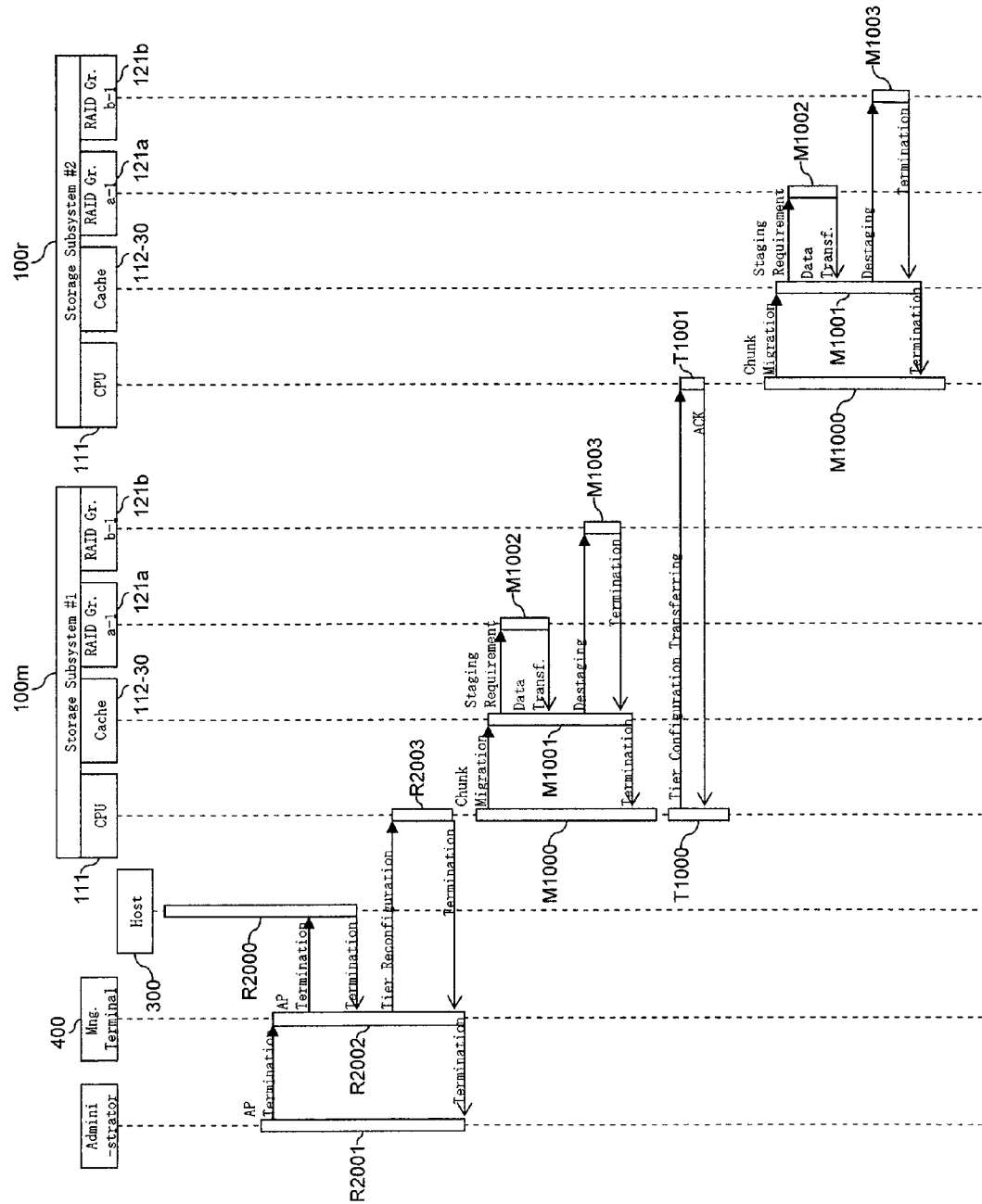
FIG. 40 illustrates an example of a sequence of application termination, tier changing, and tier configuration transferring.

FIG. 40 illustrates an example of a sequence of application termination, tier changing, and tier configuration transferring. As compared to the first embodiment of FIG. 31, FIG. 40 includes the additional sequence for tier configuration transferring as follows. In T1000, the storage subsystem 100m transfers information of the Volume Page Management Table 112-11-6 and Application Tier Management Table 112-11-9 to the storage subsystem 100r. In T1001, the storage subsystem 100r receives the information of the Volume Page Management Table 112-11-6 and Application Tier Management Table 112-11-9 from the storage subsystem 100m and overwrites with the information.

From the foregoing, it will be apparent that the invention provides methods, apparatuses and programs stored on computer readable media for dynamic page reallocation storage system management. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage system for storage management in a tiered storage environment in a system having one or more applications running on a host computer which is connected to the storage system, the storage system comprising:
a plurality of storage volumes in a pool which are divided into a plurality of tiers having different tier levels, the tiers being organized according to a tier configuration rule, the plurality of storage volumes provided by a plurality of physical storage devices in the storage system; and
a controller controlling the plurality of physical storage devices, the controller including a processor and a memory;
wherein the controller allocates the pool to a plurality of virtual volumes based on a change of the tier levels against the physical storage devices;
wherein the controller stores a relation between data in the storage system being accessed by each application running on the host computer and an application ID of the application running on the host computer and accessing the data;
wherein the application ID of the application accessing the data is provided in an I/O (Input/Output) frame sent from the host computer; and
wherein the tier level of a portion of a storage volume of the plurality of storage volumes is changed based at least in part on the application accessing data in the storage volume as identified by the relation between the data and the application ID of the application accessing the data.

2. A storage system according to claim 1,
wherein the controller stores a relation between data in a storage volume in the storage system being accessed by each application running on the host computer and an application ID of the application which publishes write I/O to the storage volume containing the data accessed by the application.

3. A storage system according to claim 1,
wherein the tier level of the portion of the storage volume is changed based at least in part on an application status of the application accessing data in the storage volume, the application status including at least one of priority, activity, or performance requirement of the application.

4. A storage system according to claim 1,
wherein the controller dynamically allocates the pool to the plurality of virtual volumes based on the change of tier levels against the physical storage devices, and dynamically stores the relation between the data in the storage system being accessed by each application running on the host computer and the application ID of the application accessing the data.

5. A storage system according to claim 1,
wherein the controller allocates the pool to the plurality of virtual volumes based on a change of tier levels against the physical storage devices in response to an input from a management terminal.

6. A storage system according to claim 1,
wherein at least one virtual volume of the plurality of virtual volumes has one or more designated areas that are capable of setting the tier level therein in accordance with changing tier configurations by the controller.

7. A storage system according to claim 1,
wherein the application ID is selected from the group consisting of an IP address set to the application in an iSCSI frame, a Fibre Channel ID of the application in a Fibre Channel frame, and a Fibre Channel ID of the application in a Fibre Channel over Ethernet frame.

8. A storage system according to claim 1,
wherein the storage system is connected to a remote storage system;
wherein at least one of the storage volumes in the storage system is in remote copy paired status with a remote storage volume in the remote storage system and is one of a replication source volume or a replication target volume;
wherein for a replication source volume, the controller transfers tier information of the replication source volume to the remote storage volume as a replication target volume in paired status with the replication source volume; and
wherein for a replication target volume, the controller receives tier information of the replication target volume from the remote storage volume as a replication source volume in paired status with the replication target volume.

9. In a system including a storage system connected to a host computer which has one or more applications running thereon and a remote storage system connected to a remote host computer which has one or more applications running thereon, the storage system and the remote storage system for storage management in a tiered storage environment and being connected to one another, the storage system comprising:
a plurality of storage volumes in a pool which are divided into a plurality of tiers having different tier levels, the tiers being organized according to a tier configuration rule, the plurality of storage volumes provided by a plurality of physical storage devices in the storage system; and a controller controlling the plurality of physical storage devices, the controller including a processor and a memory;

wherein the controller allocates the pool to a plurality of virtual volumes based on a change of the tier levels against the physical storage devices;

wherein the controller stores a relation between data in the storage system being accessed by each application running on the host computer and an application ID of the application running on the host computer accessing the data;

wherein the application ID of the application accessing the data is provided in an I/O (Input/Output) frame sent from the host computer; and wherein the tier level of a portion of a storage volume of the plurality of storage volumes is changed based at least in part on the application accessing data in the storage volume as identified by the relation between the data and the application ID of the application accessing the data.

10. The storage system according to claim 9, wherein at least one of the storage volumes in the storage system is in remote copy paired status with a remote storage volume in the remote storage system and is one of a replication source volume or a replication target volume;

wherein for a replication source volume, the controller transfers tier information of the replication source volume to the remote storage volume as a replication target volume in paired status with the replication source volume; and wherein for a replication target volume, the controller receives tier information of the replication target volume from the remote storage volume as a replication source volume in paired status with the replication target volume.

11. The storage system according to claim 10, wherein the controller stores a relation between data in a storage volume in the storage system being accessed by each application running on the host computer and an application ID of the application which publishes write I/O to the storage volume containing the data accessed by the application.

12. The storage system according to claim 10, wherein the tier level of the portion of the storage volume is changed based at least in part on an application status of the application accessing data in the storage volume, the application status including at least one of priority, activity, or performance requirement of the application.

13. The storage system according to claim 10, wherein the controller dynamically allocates the pool to the plurality of virtual volumes based on the change of tier levels against the physical storage devices, and dynamically stores the relation between the data in the storage system being accessed by each application running on the host computer and the application ID of the application accessing the data.

14. The storage system according to claim 10, wherein the controller allocates the pool to the plurality of virtual volumes based on a change of tier levels against the physical storage devices in response to an input from a management terminal.

15. The storage system according to claim 10, wherein at least one virtual volume of the plurality of virtual volumes has one or more designated areas that are capable of setting the tier level therein in accordance with changing tier configurations by the controller.

16. The storage system according to claim 10, wherein the application ID is selected from the group consisting of an IP address set to the application in an iSCSI frame, a Fibre Channel ID of the application in a Fibre Channel frame, and a Fibre Channel ID of the application in a Fibre Channel over Ethernet frame.

17. In a system including a storage system connected to a host computer and a remote storage system connected to a remote host computer, the storage system and the remote storage system for storage management in a tiered storage environment and being connected to one another, the storage system comprising:

a plurality of storage volumes in a pool which are divided into a plurality of tiers having different tier levels, the tiers being organized according to a tier configuration rule, the plurality of storage volumes provided by a plurality of physical storage devices in the storage system; and a controller controlling the plurality of physical storage devices, the controller including a processor and a memory;

wherein the controller allocates the pool to a plurality of virtual volumes based on a change of the tier levels against the physical storage devices, wherein the tier level of a virtual volume page of the plurality of virtual volumes is changed based on a change in the tier configuration rule, wherein when a tier level of the virtual volume page is changed for a volume having remote copy pair, the controller sends information of the tier level of the virtual volume page to the remote storage system so that tier level of corresponding virtual volume page is changed in the remote storage system;

wherein the tier level of a storage volume of the plurality of storage volumes is changed based at least in part on an application running on the host computer and accessing data in the storage volume, as identified by a relation between the data and an application ID of the application accessing the data;

wherein the application ID of the application accessing the data is provided in an I/O (Input/Output) frame sent from the host computer.

18. The storage system according to claim 17, wherein the tier level of the storage volume of the plurality of storage volumes is changed based at least in part on an application status of the application accessing data in the storage volume, the application status including at least one of priority, activity, or performance requirement of the application.

19. The storage system according to claim 17, wherein at least one of the storage volumes in the storage system is in remote copy paired status with a remote storage volume in the remote storage system, and when a tier level of the virtual volume page is changed the remote copy paired status is checked to determine whether the virtual volume is paired or not, and wherein the tier level of the corresponding virtual volume page is changed by migrating the virtual volume page to another virtual volume page meeting the tier level configuration.

20. The storage system according to claim 19,
wherein after the migration mapping information between the virtual volume page and the pool is updated.

* * * * *